(12) United States Patent
Söödi et al.

(10) Patent No.: US 12,337,886 B2
(45) Date of Patent: Jun. 24, 2025

(54) BEVERAGE SERVING TROLLEY

(71) Applicant: Dometic Sweden AB, Solna (SE)

(72) Inventors: Birk Söödi, Johanneshov (SE);
Samuele Meda, Chichester (GB)

(73) Assignee: Dometic Sweden AB, Solna (SE)

( * ) Notice: Subject to any disclaimer, the term of this patent is extended or adjusted under 35 U.S.C. 154(b) by 214 days.

(21) Appl. No.: 17/794,588

(22) PCT Filed: Jan. 21, 2021

(86) PCT No.: PCT/EP2021/051249
§ 371 (c)(1),
(2) Date: Jul. 21, 2022

(87) PCT Pub. No.: WO2021/148494
PCT Pub. Date: Jul. 29, 2021

(65) Prior Publication Data
US 2023/0099104 A1     Mar. 30, 2023

(30) Foreign Application Priority Data

Jan. 23, 2020   (DE) .......................... 102020200825.6

(51) Int. Cl.
*B62B 3/00* (2006.01)
*A47B 31/00* (2006.01)
(Continued)

(52) U.S. Cl.
CPC .............. *B62B 3/005* (2013.01); *A47B 31/02* (2013.01); *B62B 3/003* (2013.01); *B62B 3/004* (2013.01);
(Continued)

(58) Field of Classification Search
CPC ......... B62B 3/005; B62B 3/003; B62B 3/004; B62B 3/10; A47B 31/02; A47B 31/002
(Continued)

(56) References Cited

U.S. PATENT DOCUMENTS 1,948,937 A * 2/1934 De Muth ............... A47B 31/02
                                                       312/351
1,985,412 A * 12/1934 Jackson ................. A47B 31/00
                                                       126/146
(Continued)

FOREIGN PATENT DOCUMENTS

AU      2021209826 A1    6/2022
AU      2021210148 A1    6/2022
(Continued)

OTHER PUBLICATIONS

Notice of Allowability issued in U.S. Appl. No. 29/867,318 mailed on Oct. 20, 2023.
(Continued)

*Primary Examiner* — Hau V Phan
(74) *Attorney, Agent, or Firm* — Dinsmore & Shohl LLP

(57) ABSTRACT

A beverage serving trolley having a supporting structure, a handle located at a side of the beverage serving trolley for moving the beverage serving trolley, at least one wheel and a presentation basket comprising a basket handle and being configured to receive beverage bottles and ice cubes, wherein the presentation basket is arranged on the top side of the beverage serving trolley and is inserted into the beverage serving trolley, and that the presentation basket is removable from the beverage serving trolley by lifting the presentation basket in an upward direction by the basket handle.

15 Claims, 17 Drawing Sheets

(51) Int. Cl.
*A47B 31/02* (2006.01)
*B62B 3/10* (2006.01)

(52) U.S. Cl.
CPC .......... *B62B 3/10* (2013.01); *A47B 2031/002* (2013.01); *A47B 2031/003* (2013.01); *B62B 2202/12* (2013.01); *B62B 2202/67* (2013.01); *B62B 2204/04* (2013.01)

(58) Field of Classification Search
USPC ...................................................... 280/47.34
See application file for complete search history.

(56) References Cited

U.S. PATENT DOCUMENTS

| | | | |
|---|---|---|---|
| 2,116,312 A * | 5/1938 | Hollett ...................... | B62B 3/10 |
| | | | 211/1 |
| D145,897 S | 11/1946 | Hathaway | |
| 2,728,485 A | 12/1955 | Howard | |
| 3,463,353 A | 8/1969 | Peebles | |
| 3,874,531 A * | 4/1975 | Mayo ....................... | B62B 3/10 |
| | | | 280/47.35 |
| D235,488 S | 6/1975 | Swalm | |
| 4,098,424 A | 7/1978 | Liebscher et al. | |
| 4,690,417 A * | 9/1987 | Betts ......................... | B62B 3/02 |
| | | | 280/42 |
| D298,079 S | 10/1988 | Chatham et al. | |
| 4,875,696 A * | 10/1989 | Welch ....................... | B62B 5/04 |
| | | | 188/19 |
| D307,967 S | 5/1990 | Lanius | |
| 4,923,202 A * | 5/1990 | Breveglieri ............... | B62B 3/10 |
| | | | 280/47.35 |
| D327,562 S | 6/1992 | Brightbill | |
| D329,135 S | 9/1992 | Embree | |
| D364,039 S | 11/1995 | Kruger | |
| D386,616 S | 11/1997 | Nimer | |
| 5,848,695 A | 12/1998 | Harris et al. | |
| D420,221 S | 2/2000 | Williams et al. | |
| 6,193,247 B1 | 2/2001 | Spear et al. | |
| D468,881 S | 1/2003 | Cox | |
| D484,011 S | 12/2003 | Strobel et al. | |
| 6,758,482 B2 | 7/2004 | Stallbaumer | |
| 6,866,494 B2 * | 3/2005 | Tomlinson ............... | B29C 48/49 |
| | | | 425/467 |
| D537,251 S | 2/2007 | Musgrove | |
| 7,536,868 B1 | 5/2009 | Ward | |
| 7,648,147 B2 * | 1/2010 | Lauer ....................... | B62B 3/104 |
| | | | 280/47.35 |
| 7,891,678 B2 | 2/2011 | Anderson et al. | |
| 7,988,160 B2 * | 8/2011 | Lindner ................... | B62B 3/008 |
| | | | 280/638 |
| D649,786 S | 12/2011 | Lipfert et al. | |
| D671,703 S | 11/2012 | Guasta et al. | |
| D688,589 S | 8/2013 | Hung et al. | |
| D690,109 S | 9/2013 | Shupp | |
| 8,540,255 B2 * | 9/2013 | Young ...................... | B62B 3/10 |
| | | | 280/47.35 |
| D690,939 S | 10/2013 | Lintz et al. | |
| 8,544,141 B1 | 10/2013 | Kyde et al. | |
| 8,556,740 B1 | 10/2013 | Schneider | |
| D697,284 S * | 1/2014 | Ho ............................. | D34/12 |
| 8,696,028 B2 * | 4/2014 | Nelson ..................... | A47L 13/50 |
| | | | 280/47.35 |
| D704,935 S | 5/2014 | Lintz et al. | |
| D725,910 S | 4/2015 | Sampaio | |
| D734,913 S * | 7/2015 | Adams ..................... | B62B 3/005 |
| | | | D34/17 |
| 9,205,951 B1 | 12/2015 | Roman | |
| 9,216,751 B2 * | 12/2015 | Adams ..................... | B62B 3/005 |
| 9,315,204 B1 * | 4/2016 | Birrell .................... | B65F 1/0053 |
| D783,287 S | 4/2017 | Swartzel | |
| 9,623,890 B1 | 4/2017 | Horowitz | |
| D789,690 S | 6/2017 | Foley et al. | |
| D812,377 S | 3/2018 | Shpitzer et al. | |
| 9,989,299 B1 | 6/2018 | Ballard | |
| D825,999 S | 8/2018 | Glass et al. | |
| 10,106,182 B2 * | 10/2018 | Camarco ............... | B62B 5/0003 |
| D838,482 S | 1/2019 | Pistauer | |
| 10,463,180 B1 | 11/2019 | Donnelly et al. | |
| D876,835 S | 3/2020 | Libman et al. | |
| D880,162 S | 4/2020 | Zemel et al. | |
| D895,292 S | 9/2020 | Barness | |
| D923,903 S | 6/2021 | Shane et al. | |
| D939,214 S | 12/2021 | Söödi | |
| D968,047 S | 10/2022 | Söödi et al. | |
| D990,087 S | 6/2023 | Söödi et al. | |
| D991,614 S | 7/2023 | Söödi et al. | |
| 2002/0109318 A1 * | 8/2002 | Calmeise ................ | A47L 13/51 |
| | | | 280/47.35 |
| 2003/0121277 A1 | 7/2003 | Simmons | |
| 2003/0201619 A1 | 10/2003 | Teng et al. | |
| 2007/0267832 A1 * | 11/2007 | Denissov ............... | A47L 9/0009 |
| | | | 280/47.35 |
| 2009/0236810 A1 | 9/2009 | Anderson et al. | |
| 2010/0066045 A1 * | 3/2010 | Presnell .................. | B62B 5/061 |
| | | | 280/47.18 |
| 2011/0232102 A1 | 9/2011 | Holmes | |
| 2013/0057133 A1 | 3/2013 | Kool | |
| 2014/0318156 A1 | 10/2014 | Richardson et al. | |
| 2015/0097001 A1 | 4/2015 | Gatipon | |
| 2015/0344052 A1 | 12/2015 | McClanahan et al. | |
| 2016/0113395 A1 | 4/2016 | Martell et al. | |
| 2016/0176637 A1 * | 6/2016 | Ackerman ........... | G06Q 10/087 |
| | | | 700/215 |
| 2016/0207556 A1 * | 7/2016 | Unrath ..................... | B62B 3/027 |
| 2017/0327141 A1 * | 11/2017 | Thuma ..................... | B62B 3/10 |
| 2017/0340105 A1 * | 11/2017 | Knighton ................ | B62B 3/005 |
| 2018/0055218 A1 | 3/2018 | Mueller | |
| 2018/0132609 A1 | 5/2018 | Knighton | |
| 2023/0099104 A1 | 3/2023 | Söödi et al. | |
| 2023/0106691 A1 | 4/2023 | Söödi et al. | |
| 2023/0114863 A1 | 4/2023 | Soodi et al. | |
| 2023/0143591 A1 | 5/2023 | Soodi et al. | |
| 2024/0075972 A1 | 3/2024 | Munson | |

FOREIGN PATENT DOCUMENTS

| | | |
|---|---|---|
| AU | 2021210564 A1 | 6/2022 |
| AU | 2021211886 A1 | 6/2022 |
| CN | 102076547 A | 5/2011 |
| CN | 306351541 S | 2/2021 |
| CN | 306351542 S | 2/2021 |
| CN | 114929550 A | 8/2022 |
| CN | 114929551 A | 8/2022 |
| CN | 114929552 A | 8/2022 |
| CN | 114929553 A | 8/2022 |
| DE | 1788154 U | 5/1959 |
| DE | 102020200825 A1 | 7/2021 |
| DE | 102020200829 A1 | 7/2021 |
| DE | 102020200830 A1 | 7/2021 |
| DE | 102020200831 A1 | 7/2021 |
| EP | 1000865 A1 | 5/2000 |
| EP | 2236428 A1 | 10/2010 |
| EP | 4037952 A1 | 8/2022 |
| EP | 4037953 A1 | 8/2022 |
| EP | 4041612 A1 | 8/2022 |
| EP | 4077099 A1 | 10/2022 |
| KR | 20120006719 U | 10/2012 |
| WO | 9512513 A1 | 5/1995 |
| WO | WO2021148470 A1 | 7/2021 |
| WO | WO2021148471 A1 | 7/2021 |
| WO | WO2021148493 A1 | 7/2021 |
| WO | WO2021148494 A1 | 7/2021 |

OTHER PUBLICATIONS

Notice of Allowability issued in U.S. Appl. No. 29/867,316 mailed on Feb. 15, 2023.
Notice of Allowability issued in U.S. Appl. No. 29/867,317 mailed on Feb. 9, 2023.
Restriction Requirement Issued in U.S. Appl. No. 29/867,318 mailed on Apr. 5, 2023.

(56) References Cited

OTHER PUBLICATIONS

Corrected Notice of Allowability issued in U.S. Appl. No. 29/867,316 mailed on May 5, 2023.
Corrected Notice of Allowability issued in U.S. Appl. No. 29/867,317 mailed on May 5, 2023.
Ex-Parte Quayle Action Issued in U.S. Appl. No. 29/867,318 mailed on Jun. 27, 2023.
Patent Certificate issued in DE Application No. 102020200830.2 mailed on Nov. 30, 2023.
Corrected Notice of Allowability issued in U.S. Appl. No. 29/867,316 mailed on Mar. 1, 2023.
Corrected Notice of Allowability issued in U.S. Appl. No. 29/867,317 mailed on Mar. 1, 2023.
U.S. Appl. No. 29/743,514, filed Jul. 22, 2020.
Corrected Notice of Allowability Issued in U.S. Appl. No. 29/743,513 mailed on Aug. 24, 2022.
Corrected Notice of Allowability Issued in U.S. Appl. No. 29/743,513 mailed on Sep. 14, 2022.
Notice of Allowability issued in U.S. Appl. No. 29/819,002 mailed on Nov. 7, 2022.
U.S. Appl. No. 29/867,316 titled "Beverage Cart" filed Oct. 19, 2022.
U.S. Appl. No. 29/867,317 titled "Beverage Cart" filed Oct. 19, 2022.
U.S. Appl. No. 29/867,318 titled "Beverage Cart" filed Oct. 19, 2022.
Corrected Notice of Allowability issued in U.S. Appl. No. 29/819,002 mailed on Dec. 7, 2022.
Decision of Grant issued in DE Application No. 102020200830.2 mailed on Aug. 22, 2023.
Decision of Grant issued in DE Application No. 102020200831.0 mailed on Aug. 22, 2023.
Notice of Allowability issued in U.S. Appl. No. 29/867,318 mailed on Sep. 21, 2023.
Decision to Grant issued in EP Application No. 21701715.1 mailed on Apr. 5, 2024.
Decision to Grant issued in EP Application No. 21701303.6 mailed on Apr. 11, 2024.
Decision to Grant issued in EP Application No. 21701483.6 mailed on Apr. 25, 2024.
Australian Patent Application No. 202013740 filed Jul. 9, 2020.
Australian Patent Application No. 202013761 filed Jul. 9, 2020.
Australian Patent Application No. 202013767 filed Jul. 9, 2020.
Australian Patent Application No. 202013729 filed Jul. 9, 2020.
Australian Patent Application No. 202013764 filed Jul. 9, 2020.
Australian Patent Application No. 202013728 filed Jul. 9, 2020.
Australian Patent Application No. 202013756 filed Jul. 9, 2020.
Australian Patent Application No. 202013721 filed Jul. 9, 2020.
Australian Patent Application No. 202013725 filed Jul. 9, 2020.
Australian Patent Application No. 202013723 filed Jul. 9, 2020.
Australian Patent Application No. 202013768 filed Jul. 9, 2020.
Australian Patent Application No. 202013758 filed Jul. 9, 2020.
Chinese Patent Application No. 202030338770.3 filed Jun. 29, 2020.
Chinese Patent Application No. 202030339270.1 filed Jun. 29, 2020.
Chinese Patent Application No. 202030339255.7 filed Jun. 29, 2020.
Chinese Patent Application No. 202030339797.4 filed Jun. 29, 2020.
EU Design Patent Application No. 007548334-0018 filed on Jan. 23, 2020.
Examination Report received in EU Design Patent Application No. 007548334-0018 on Feb. 28, 2020.
Examination Report received in EU Design Patent Application No. 007548334-0018 on Jan. 30, 2020.
EU Design Patent Application No. 007548334-0017 filed on Jan. 23, 2020.
EU Design Patent Application No. 007548334-0016 filed on Jan. 23, 2020.
EU Design Patent Application No. 007548334-0014 filed on Jan. 23, 2020.
EU Design Patent Application No. 007548334-0003 filed on Jan. 23, 2020.
EU Design Patent Application No. 007548334-0019 filed on Jan. 23, 2020.
EU Design Patent Application No. 007548805-0004 filed on Jan. 23, 2020.
EU Design Patent Application No. 007548334-0012 filed on Jan. 23, 2020.
EU Design Patent Application No. 007548334-0011 filed on Jan. 23, 2020.
EU Design Patent Application No. 007548334-0009 filed on Jan. 23, 2020.
EU Design Patent Application No. 007548334-0021 filed on Jan. 23, 2020.
EU Design Patent Application No. 007548805-0002 filed on Jan. 23, 2020.
EU Design Patent Application No. 007548805-0003 filed on Jan. 23, 2020.
EU Design Patent Application No. 007548334-0008 filed on Jan. 23, 2020.
EU Design Patent Application No. 007548334-0029 filed on Jan. 23, 2020.
EU Design Patent Application No. 007548334-0005 filed on Jan. 23, 2020.
EU Design Patent Application No. 007548334-0013 filed on Jan. 23, 2020.
EU Design Patent Application No. 007548334-0024 filed on Jan. 23, 2020.
EU Design Patent Application No. 007548334-0001 filed on Jan. 23, 2020.
EU Design Patent Application No. 007548334-0006 filed on Jan. 23, 2020.
EU Design Patent Application No. 007548334-0025 filed on Jan. 23, 2020.
EU Design Patent Application No. 007548334-0023 filed on Jan. 23, 2020.
EU Design Patent Application No. 007548334-0015 filed on Jan. 23, 2020.
EU Design Patent Application No. 007548334-0026 filed on Jan. 23, 2020.
EU Design Patent Application No. 007548334-0030 filed on Jan. 23, 2020.
EU Design Patent Application No. 007548334-0022 filed on Jan. 23, 2020.
EU Design Patent Application No. 007548334-0007 filed on Jan. 23, 2020.
EU Design Patent Application No. 007548334-0004 filed on Jan. 23, 2020.
EU Design Patent Application No. 007548805-0001 filed on Jan. 23, 2020.
EU Design Patent Application No. 007548334-0020 filed on Jan. 23, 2020.
EU Design Patent Application No. 007548334-0002 filed on Jan. 23, 2020.
EU Design Patent Application No. 007548334-0027 filed on Jan. 23, 2020.
Intention to Grant issued in EP Application No. 21701715.1 mailed on Jan. 19, 2024.
Intention to Grant issued in EP Application No. 21701302.8 mailed on Jan. 19, 2024.
Intention to Grant issued in EP Application No. 21701303.6 mailed on Jan. 19, 2024.
Intention to Grant issued in EP Application No. 21701483.6 mailed on Jan. 25, 2024.
Non Final Office Action issued in U.S. Appl. No. 17/794,589 mailed on Mar. 27, 2024.
Decision to Grant issued in EP Application No. 21701302.8 mailed on Mar. 28, 2024.
EU Design Patent Application No. 007548334-0028 filed on Jan. 23, 2020.

(56) References Cited

OTHER PUBLICATIONS

EU Design Patent Application No. 007548334-0010 filed on Jan. 23, 2020.
DE Patent Application No. 102020200825.6 filed on Jan. 23, 2020.
DE Patent Application No. 102020200829.9 filed on Jan. 23, 2020.
DE Patent Application No. 102020200830.2 filed on Jan. 23, 2020.
DE Patent Application No. 102020200831.0 filed on Jan. 23, 2020.
U.S. Appl. No. 29/743,513, filed Jul. 22, 2020.
PCT Patent Application No. PCT/EP2021/051207 filed on Jan. 20, 2021.
PCT Patent Application No. PCT/EP2021/051249 filed on Jan. 21, 2021.
PCT Patent Application No. PCT/EP2021/051208 filed on Jan. 20, 2021.
PCT Patent Application No. PCT/EP2021/051247 filed on Jan. 21, 2021.
Notification to Grant Chinese Patent Application No. 202030339270.1 mailed on Jan. 26, 2021.
Notification to Grant Chinese Patent Application No. 202030339797.4 mailed on Nov. 24, 2020.
Notification to Grant Chinese Patent Application No. 202030339255.7 mailed on Nov. 24, 2020.
International Search Report Issued in PCT Application No. PCT/EP2021/051207 mailed on Apr. 13, 2021.
International Search Report Issued in PCT Application No. PCT/EP2021/051208 mailed on Apr. 13, 2021.
International Search Report Issued in PCT Application No. PCT/EP2021/051247 mailed on Apr. 13, 2021.
International Search Report Issued in PCT Application No. PCT/EP2021/051249 mailed on Apr. 13, 2021.
United Kingdom Design Application No. 6157124 filed on Aug. 26, 2021.
United Kingdom Design Application No. 6157125 filed on Aug. 26, 2021.
U.S. Appl. No. 29/819,002, filed Dec. 13, 2021.
Corrected Notice of Allowance Issued in U.S. Appl. No. 29/743,514 mailed on Oct. 18, 2021.
Restriction Requirement Issued in U.S. Appl. No. 29/743,513 mailed on Dec. 16, 2021.
United Kingdom Design Application No. 6167156- 6167185 filed on Sep. 30, 2021.
Notice of Allowance Issued in U.S. Appl. No. 29/743,514 mailed on Aug. 23, 2021.
Examination Report Issued in German Application No. 102020200825.6 mailed on Jun. 28, 2021.
Examination Report Issued in German Application No. 102020200829.9 mailed on Jun. 28, 2021.
Examination Report Issued in German Application No. 102020200830.2 mailed on Jun. 28, 2021.
Examination Report Issued in German Application No. 102020200831 mailed on Jun. 28, 2021.
Notice of Allowance Issued in U.S. Appl. No. 29/743,513 mailed on Mar. 30, 2022.
Notice of Allowance Issued in U.S. Appl. No. 29/819,002 mailed on Mar. 9, 2022.
Corrected Notice of Allowability Issued in U.S. Appl. No. 29/743,513 mailed on Apr. 25, 2022.
Notice of Allowance Issued in U.S. Appl. No. 29/819,002 mailed on May 2, 2022.
Corrected Notice of Allowability Issued in U.S. Appl. No. 29/819,002 mailed on Jun. 17, 2022.
Corrected Notice of Allowability Issued in U.S. Appl. No. 29/743,513 mailed on Jun. 17, 2022.
Australian Application No. 2021210148 filed on May 11, 2022.
Australian Application No. 2021210564 filed on May 11, 2022.
Chinese Application No. 202180006811 filed on May 27, 2022.
Australian Application No. 2021211886 filed on May 16, 2022.
European Application No. 21701303.6 filed on May 6, 2022.
Australian Application No. 2021209826 filed on May 16, 2022.
Chinese Application No. 202180006803.6 filed on May 27, 2022.
European Patent Application No. 21701715.1 filed on Apr. 25, 2022.
European Patent Application No. 21701302.8 filed on May 3, 2022.
Chinese Application No. 202180007550.4 filed on Jun. 23, 2022.
U.S. Appl. No. 17/794,589, filed Jul. 21, 2022.
Chinese Application No. 202180007551.9 filed on Jun. 23, 2022.
U.S. Appl. No. 17/794,590, filed Jul. 21, 2022.
European Application No. 21701483.6 filed on Jul. 20, 2022.
U.S. Appl. No. 17/794,591, filed Jul. 21, 2022.
Office Action issued in DE Application No. 102020200825.6 mailed on Aug. 11, 2023.
Office Action issued in DE Application No. 102020200829.9 mailed on Aug. 11, 2023.
U.S. Appl. No. 29/910,246 titled "Beverage Cart" filed Aug. 17, 2023.
U.S. Appl. No. 29/910,248 titled "Beverage Cart" filed Aug. 17, 2023.
Design U.S. Appl. No. 29/910,246, filed Aug. 17, 2023 titled Beverage Cart.
Restriction Requirement issued in U.S. Appl. No. 17/794,591 mailed on Jul. 15, 2024.
Notice of Allowance issued in U.S. Appl. No. 17/794,589 mailed on Aug. 23, 2024.
Office Action issued in CN Application No. 202180007550.4 mailed on Mar. 14, 2025.

\* cited by examiner

BEVERAGE SERVING TROLLEY

CLAIM TO PRIORITY

This 35 U.S.C. § 371 National Stage Patent Application claims priority to PCT Patent Application No. PCT/EP2021/051249, filed Jan. 21, 2021, which claims priority to and benefit of DE Patent Application Serial Number 102020200825.6, filed Jan. 23, 2020, all of which is incorporated by reference herein.

BACKGROUND

The present embodiments relate to a beverage serving trolley.

Beverage serving trolleys have generally been known for a long time. Typically, a beverage serving trolley is a mobile rack having wheels, a handle and one or more shelfs for beverage bottles.

Depending on the individual preferences, beverage serving trolleys with a number of accessories are available. In case the beverage serving trolley is used for more than just presenting beverage bottles, but also, for example, for preparing drinks, additional equipment is necessary which makes beverage serving trolleys often look messy and crowded.

Furthermore, depending on what is being served at a particular occasion, beverage serving trolleys need to be specifically equipped with certain accessories. Therefore, either various different beverage serving trolleys are necessary or an extensive reconstruction of one beverage serving trolley is necessary at each different use.

In order to overcome these drawbacks of the presently available beverage serving trolleys, the present embodiments aim to provide a beverage serving trolley which meets all requirements with minimal modifications, if at all necessary.

To achieve such, the present embodiments provide a beverage serving trolley that has a supporting structure, a handle located at a side of the beverage serving trolley for moving the beverage serving trolley, at least one wheel and a presentation basket comprising a basket handle and being configured to receive beverage bottles and ice cubes.

SUMMARY

According to the embodiments, the presentation basket is arranged on the top side of the beverage serving trolley and is inserted into the beverage serving trolley. Furthermore, the presentation basket is removable from the beverage serving trolley by lifting the presentation basket in an upward direction by the basket handle. By this, the beverage serving trolley of the invention is easy to be modified, simply by taking out the presentation basket with one hand.

The number, position and kind of the wheels are not particularly limited. According to some embodiments, the beverage serving trolley has two rear wheels or front wheels. The terms "rear" and "front" in the framework of the present disclosure are to be understood with respect to the direction of movement of the beverage serving trolley, when the beverage serving trolley is pushed by the handle.

In case the beverage serving trolley has only two wheels at the rear side or only two wheels at the front side, the beverage serving trolley rests on the ground at the respective opposite side with a rigid part, such as a pedestal.

The beverage serving trolley may have four wheels, two at the rear side and two at the front side. In this embodiment, all four wheels can be fixed in orientation. It may be, however, that either the rear wheels or the front wheels are configured to swivel about a vertical axis, in the manner of a castor wheel. Accordingly, in some embodiments, the rear wheels are fixed in orientation and the front wheels are configured to swivel about a vertical axis. In another embodiment, the rear wheels are configured to swivel about a vertical axis and the front wheels are fixed in orientation.

According to some embodiments, structures for external attachment of one or more accessories to the beverage serving trolley are provided at the supporting structure at different height levels. The specific kind of such structures may not be particularly limited. In some embodiments, holes are provided at different height levels on a vertical surface of the supporting structure and the various accessories can be mounted to the beverage serving trolley by engaging with the holes.

According to one embodiment, the beverage serving trolley further comprises an outer housing, including at least one first side panel and at least one edge profile covering at least in part at least one side and at least one vertical edge, respectively, of the beverage serving trolley. Both the at least one first side panel and the at least one edge profile have the same vertical extension and are mounted to the beverage serving trolley in a way that adjacent first side panels and edge profiles are connected flush with each other at their respective vertical edges with a distance, thus forming a vertical gap of an even and predetermined width between each other. Thus, at a side of the beverage serving trolley where a side panel is mounted, at least two of the vertical gaps are present. The vertical gaps provide access from the outside to the above mentioned attachment structures, respectively, the holes at the supporting structure.

The width of the vertical gap is not particularly limited. However, the vertical gap may be configured to receive the one or more accessories that are to be attached to the beverage serving trolley. In a further embodiment, the width of the vertical gap ranges from 3 mm to 8 mm.

According to an embodiment, the beverage serving trolley further comprises a horizontally arranged top plate including at least partially a flat surface and being of a rectangular shape having a rim with rounded corners. An example material of the top plate is metal, for example stainless steel.

Further, all first side panels and all edge profiles that are present at the beverage serving trolley fit flush with the rim of the top plate in a vertical downward direction with a distance, thereby forming a horizontal gap of an even and predetermined width that corresponds to the distance between the underside of the rim of the top plate and the upper edges of each of the a first side panels and the edge profiles. As in the vertical gaps, accessories can be mounted in the horizontal gap as well. The width of the horizontal gap may correspond to that of the vertical gaps.

In a further embodiment, the top plate has a cutout that is configured to accommodate the presentation basket. The presentation basket can thus be inserted into and removed from the cutout as intended, for example, for refilling the presentation basket with ice cubes.

According to one embodiment, the top plate further has at least one recessed portion that is configured to accommodate a serving tray and/or a chopping board. The recessed portion may be a sunken area of a rectangular, for example square shape. Thereby, the respectively raised edges of the recessed portion prevent a serving tray or a chopping board or any other possible accessory that is place into the recessed portion from slipping, in case if the beverage serving trolley shakes while being moved. In one embodiment, the beverage serving trolley includes both a serving tray and a chopping board that can be placed side by side into the recessed portion. In this embodiment, the square shape of the recessed portion may be preferred, because therein, the serving tray and the chopping board can be placed side by side in two different orientations, namely either along or across the moving direction of the beverage serving trolley.

According to some embodiments, the beverage serving trolley further comprises at least one door and/or at least one drawer located on a side, preferably on only one side of the beverage serving trolley. At the side where the doors and/or the drawers are present, the side panel is omitted. The outer surfaces of all present doors and drawers, when closed, are flush with the edge profiles that are arranged adjacent to the doors and drawers.

Further, all present doors and/or drawers are arranged within a vertical range defined by the vertical extension of the at least one first side panel and the at least one edge profile. The doors and drawers fill out completely said vertical range. In particular, in some embodiments of the beverage serving trolley with one door and one drawer below the door, the upper edge of the door is flush with the upper edge of a laterally adjacent edge profile and the lower edge of the drawer is flush with the lower edge of this edge profile. One door may be a door of a fridge or a freezer or one drawer is a fridge or a freezer. As such, a small stock of cooled goods or ice can always be on hand.

According to some embodiments, the beverage serving trolley further comprises a wine cooling cabinet. The wine cooling cabinet may be located next to the present doors and/or drawers and the wine cooling cabinet is accessible from the same side as the doors and/or drawers. The wine cooling cabinet may have one door with a height that corresponds to the height of the laterally adjacent edge profile.

BRIEF DESCRIPTION OF THE DRAWINGS

The present invention will now be further explained by use of exemplary embodiments illustrated in the accompanying drawings, in which.

DETAILED DESCRIPTION

Similar or identical elements in the various embodiments are labelled with the same reference numbers. The individual features of all of the described specific embodiments can generally be combined with each other, unless there are compelling technical or logical reasons to the contrary. Terms indicating any kind of orientation or direction like, for example, upwards, upper, downwards, lower, vertical, horizontal, sunken and lift up refer to the beverage serving trolley when standing on the ground, unless explicitly defined in a different manner.

Figure 1:
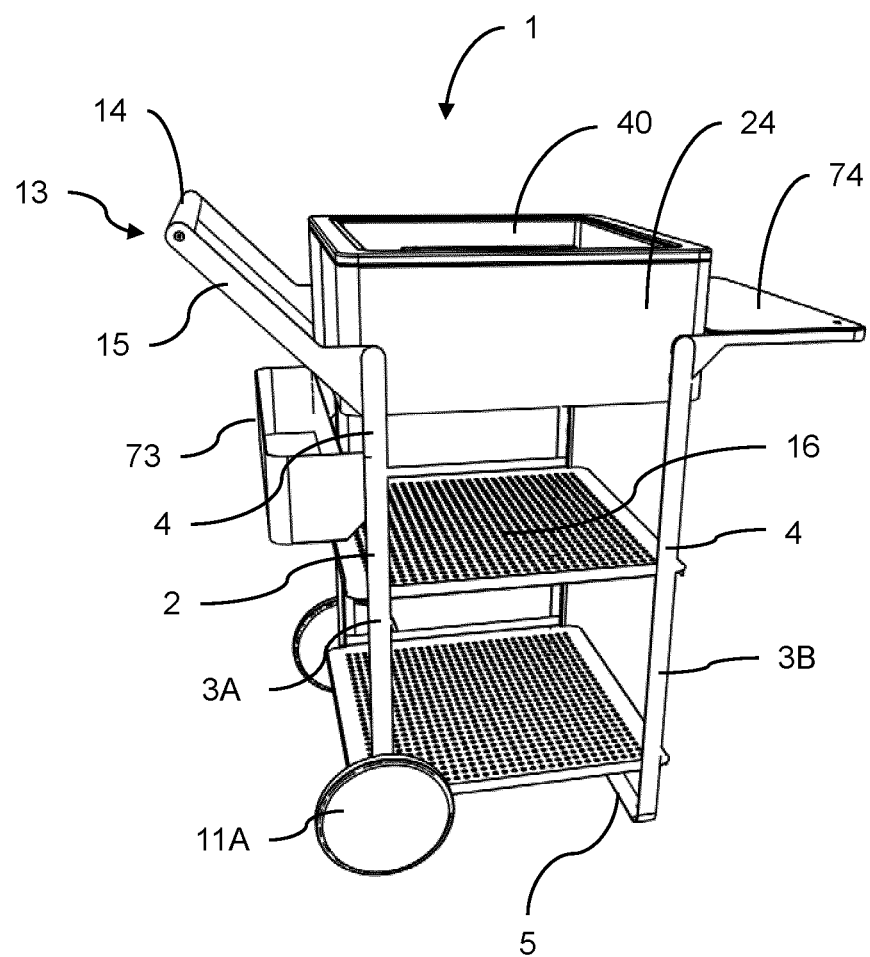
FIG. 1 shows a side view of a beverage serving trolley according to a first embodiment.
Figure 3:
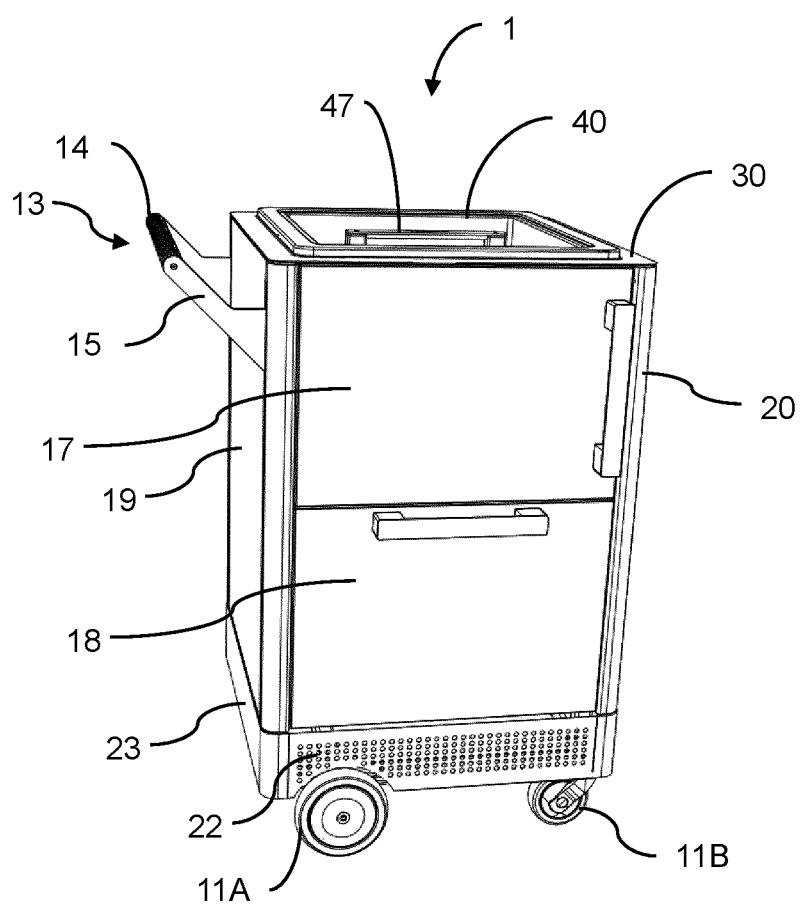
FIG. 3 shows a side view of a beverage serving trolley according to a second embodiment.
Figure 5:
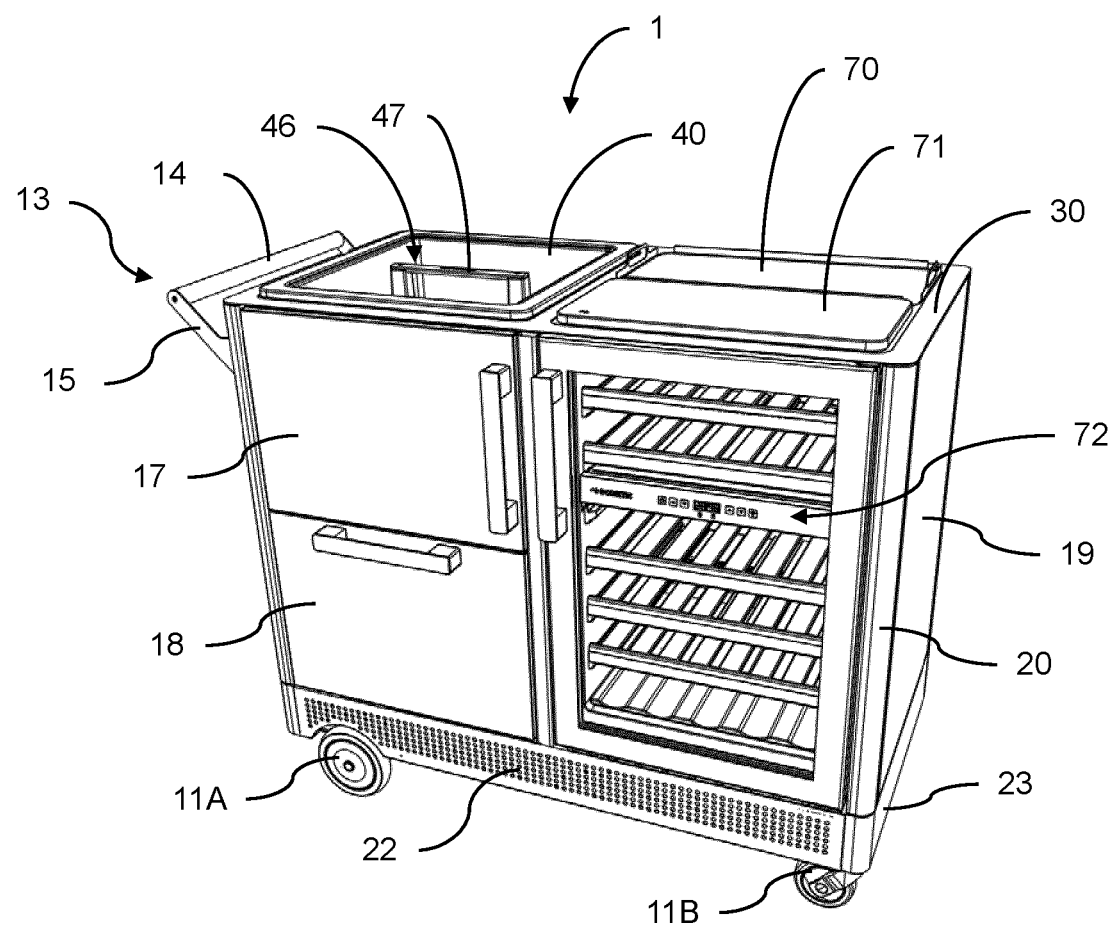
FIG. 5 shows a side view of a beverage serving trolley according to a third embodiment.

In FIGS. 1, 3 and 5, three different embodiments of the beverage serving trolley 1 are shown. In the first embodiment shown in FIG. 1, the beverage serving trolley includes a supporting structure 10 that is made-up of U-shaped steel plates 3A and 3B, each including one horizontal part 5 and two vertical parts 4. The four vertical parts 4 of the U-shaped steel plates 3A and 3B are interconnected inter alia by the shelfs 16 and by the presentation basket supporting frame 24, in order to increase the overall stability of the beverage serving trolley 1. The shelfs are freely accessible from the sides of the beverage serving trolley 1 and not covered by doors or the like. The vertical parts 4 of the U-shaped steel plate 3A at the rear side of the beverage serving trolley 1 are furthermore interconnected by the handle 13. The term "rear side" thus refers to the moving direction of the beverage serving trolley 1 when pushed from the side of the handle 13. The front side of the beverage serving trolley 1 is consequently at the opposite side of the handle 13.

In the embodiment of FIG. 1, at the rear U-shaped steel plate 3A, the rear wheels 11A are mounted, while at the front U-shaped steel plate 3B, the horizontal part 5 serves as a pedestal. The rear wheels 11A are fixed in orientation and do in particular not swivel around a vertical axis.

The shelfs 16 are made of metal sheets and are perforated with a plurality of round holes, which reduces weight. The metal sheets are bent upwards or downwards at particular sections of their edges, which increases the stability and may in addition prevent a glass that is put on a shelf 16 from falling down. In the embodiment of FIG. 1, the front edge of each shelf 16 is bent downwards and both lateral edges and the rear edge of the shelfs 16 are bent upwards.

The handle 13 is composed of the handlebar 14 mounted between the two handle brackets 15. The handle brackets 15 are made-up of steel plates as well and are flatly screwed together with the vertical parts 4 of the U-shaped steel plate 3A at the rear side.

Furthermore, between the vertical parts 4 of the rear U-shaped steel plate 3A, an accessory is removably mounted which is the storage box 73. The storage box 73 like any other appropriate accessory can simply be hung in respective hooks or protrusions (not shown) at the vertical parts 4 of both U-shaped steel plates 3A and 3B.

A further accessory, which is however rigidly mounted to the beverage serving trolley 1 between the front U-shaped steel plates 3B, is the tray 74. The mounting brackets of the tray 74 are flatly screwed together with the vertical parts 4 of the U-shaped steel plate 3B, in an analogous manner as the handle brackets 15 are mounted to the rear U-shaped steel plate 3A.

Figure 2:
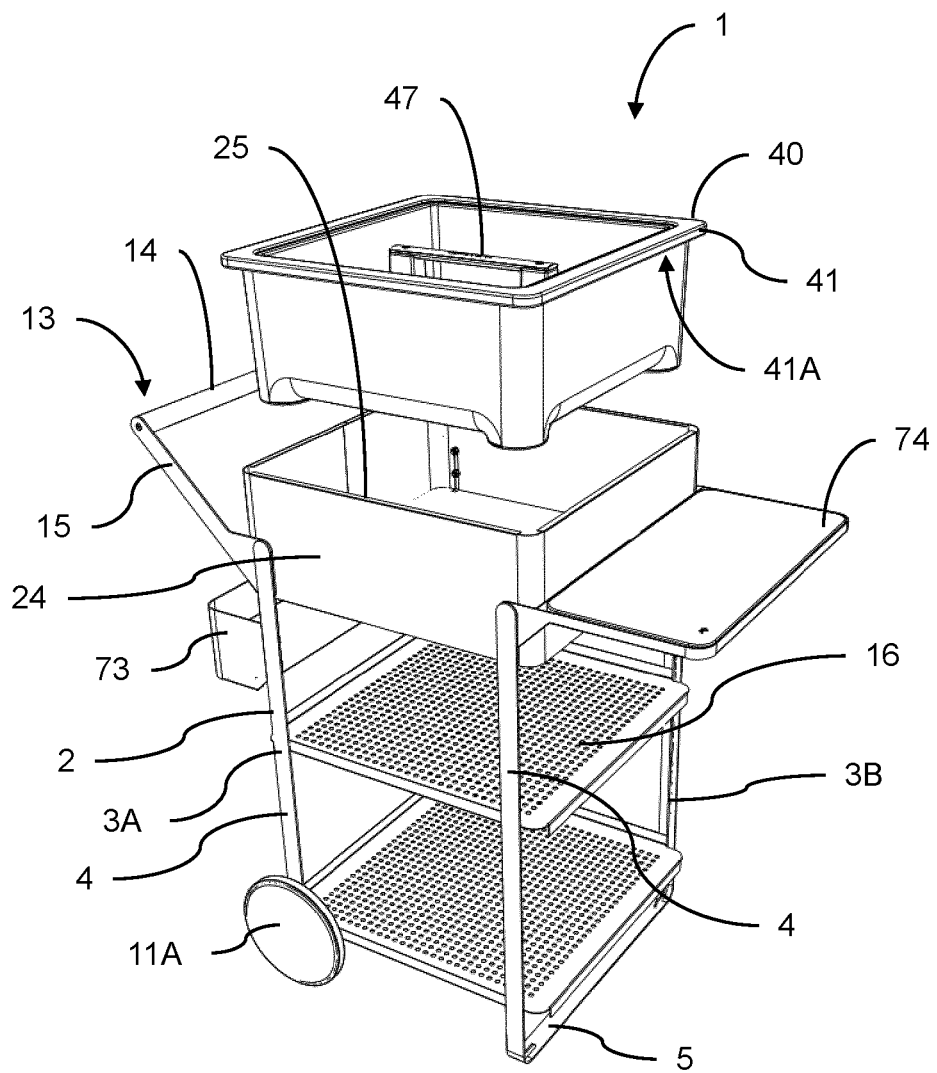
FIG. 2 shows a partly exploded view of the beverage serving trolley shown in FIG. 1.

The presentation basket supporting frame 24 has the form of a box with a square ground plate and vertical walls being sufficiently tall to accommodate the presentation basket 40. As shown in FIG. 2 in which the presentation basket is lift upwards, the presentation basket supporting frame 24 is designed to support the presentation basket 40 in a way that the upper outer rim 41 of the presentation basket 40, which laterally protrudes away, rests with its supporting surface 41A located at the underside of the protruding rim 41 on the upper edges 25 of the presentation basket supporting frame 24. This ensures a smooth and even closure between the presentation basket 40 and the presentation basket supporting frame 24.

Figure 13:
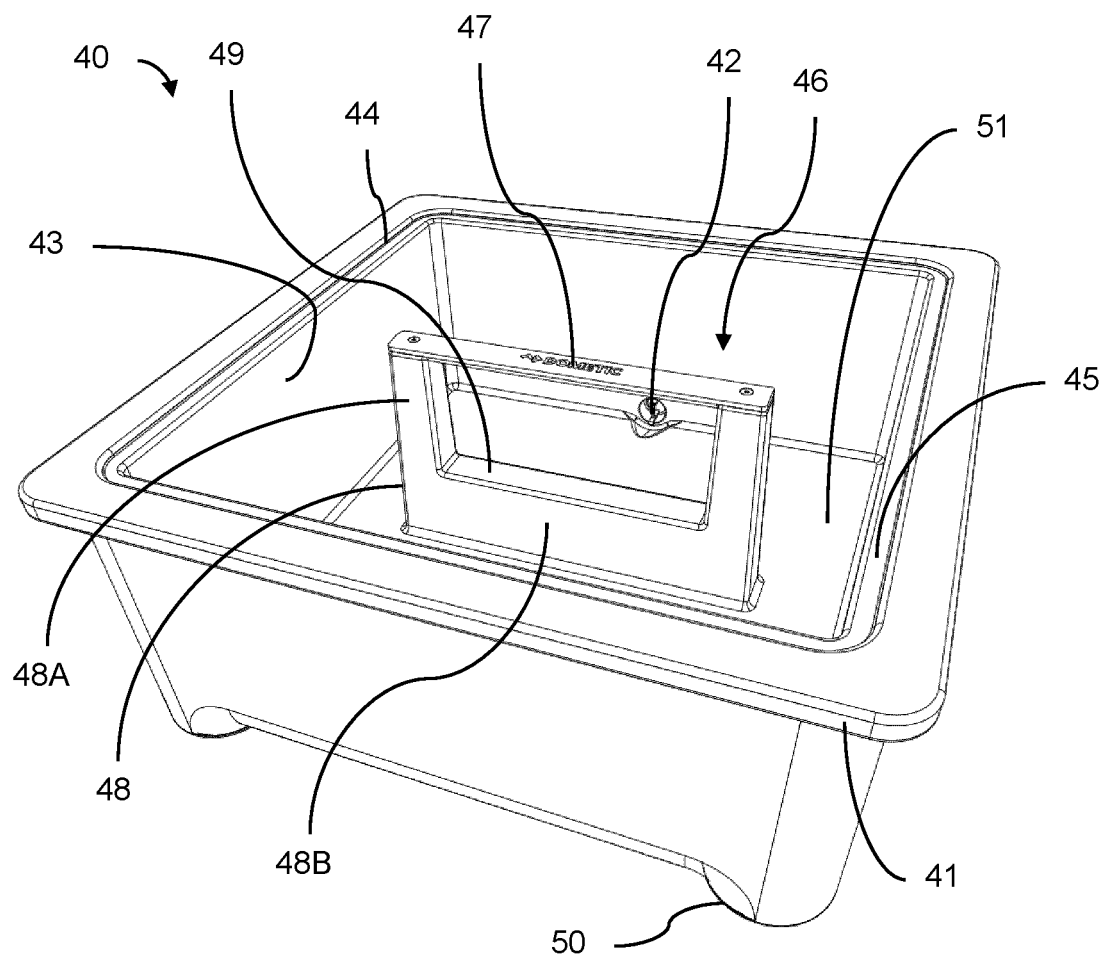
FIG. 13 shows a perspective view on the top of a presentation basket that may be comprised by a beverage serving trolley according to an embodiment and that corresponds to the one with which the beverage serving trolleys shown in FIGS. 1, 3 and 5 are equipped.
Figure 14:
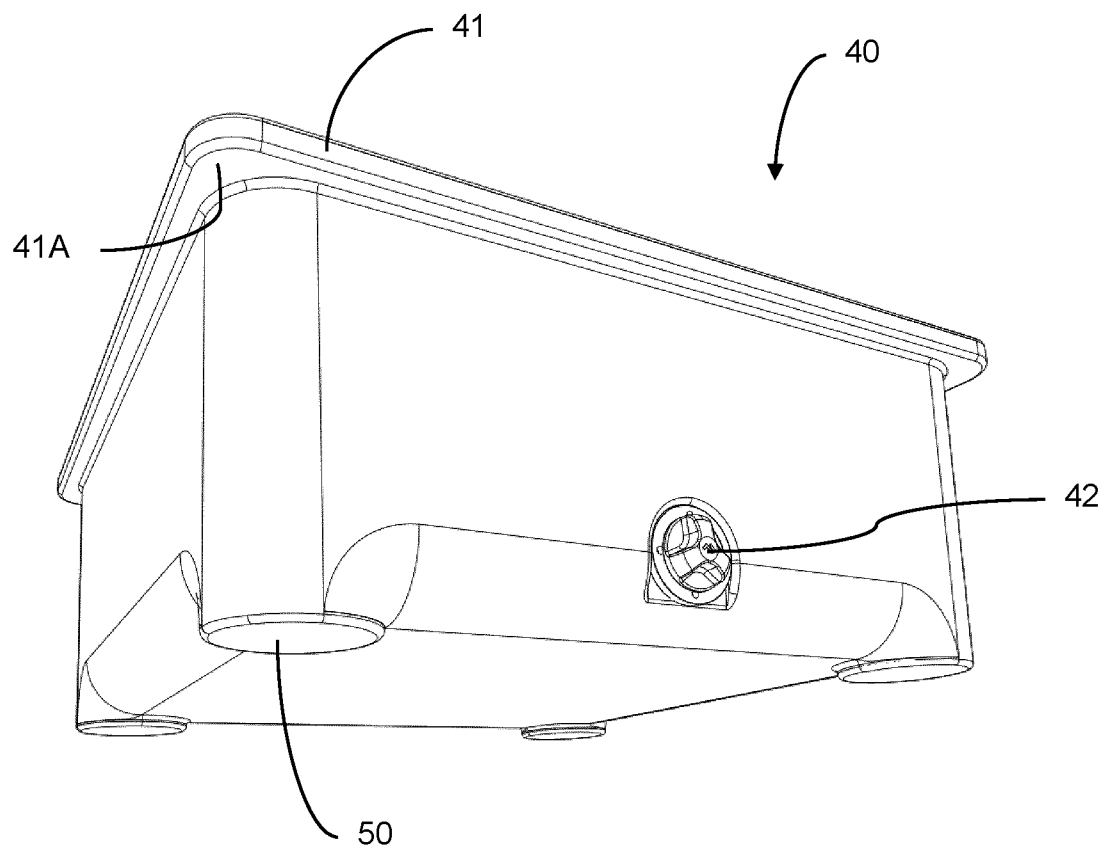
FIG. 14 shows a perspective view on the bottom of the presentation basket shown in FIG. 13.

Now, exemplary details of the presentation basket 40 are described, by which it is also referred to FIGS. 13 and 14. The presentation basket 40 has generally the form of a box open at the top with a square ground. It is watertight and is essentially composed of a one-piece, deep-drawn or injection-molded plastic component. The ground 51 and the inner side walls 43 of the presentation basket 40 represent the containment for beverages and ice cubes. The wall strength provides sufficient stability, so that, when fully packed with beverages, the presentation basket 40 can be carried by the basket handle 46 without problem. The sufficiently high wall strength furthermore has the effect of temperature isolation, so that, for example, ice cubes in the presentation basket 40 are not melting too quickly.

The basket handle 46 is provided at the center of the ground 51 of the presentation basket 40 and projects upwards from there, so that the presentation basket 40 can be carried stably and evenly by one hand. The basket handle 46 includes the elongated basket handlebar 47 and the basket handle bracket 48, which in turn is composed of two bracket columns 48A and the bracket base 48B. Between the bracket columns 48A there is provided the saddle surface 49 on the bracket base 48B. In the present embodiment, the basket handlebar 47 is a separate metal component that is screwed onto the top of each of the bracket columns 48A. The bracket columns 48A and the bracket base 48B, however, form integral parts of the one-piece plastic component of the presentation basket 40. As mentioned above, the presentation basket 40 and the respective opening into which the presentation basket 40 is accommodated (which in this case is established by the presentation basket supporting frame 24) are square from a top view, so that the presentation basket 40 can be inserted in the beverage serving trolley 1, as desired, with the basket handlebar 47 being oriented either in or transverse to the moving direction of the beverage serving trolley 1 when being pushed.

The bracket columns 48A and, respectively, the basket handlebar 47 are designed such that the basket handlebar 47 is located at a level near, but under the level of the upper edge of the presentation basket 40. At the upper inner rim 44 of the presentation basket 40 there is provided the cover accommodating area 45, which is a sunken area onto which a cover (not shown) can be placed. The level up to which the basket handlebar 47 is located is thus as high as possible, but low enough that it does not contact the cover.

At the inner side wall 43 of the presentation basket 40, an outlet 42 with plug is located near the ground 51 so that water in the presentation basket 40 can be conveniently drained.

The presentation basket 40 further includes footstands 50, one at each corner on the underside of the presentation basket 40. In case the presentation basket 40 is taken out of the beverage serving trolley 1, it can be placed with its footstands 50 on a table or a similar surface.

Figure 15:
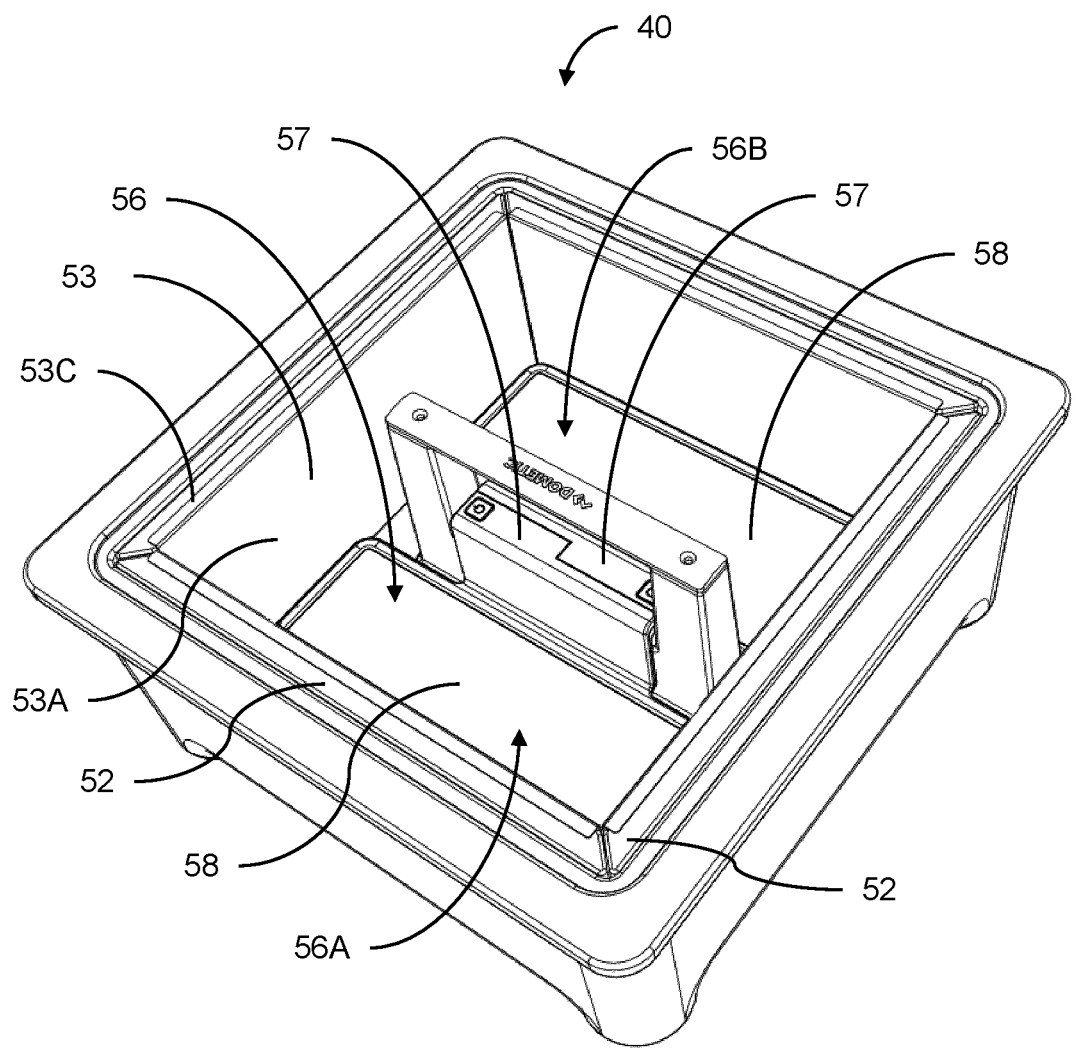
FIG. 15 shows a further equipped embodiment of the presentation basket shown in FIG. 13.
Figure 16:
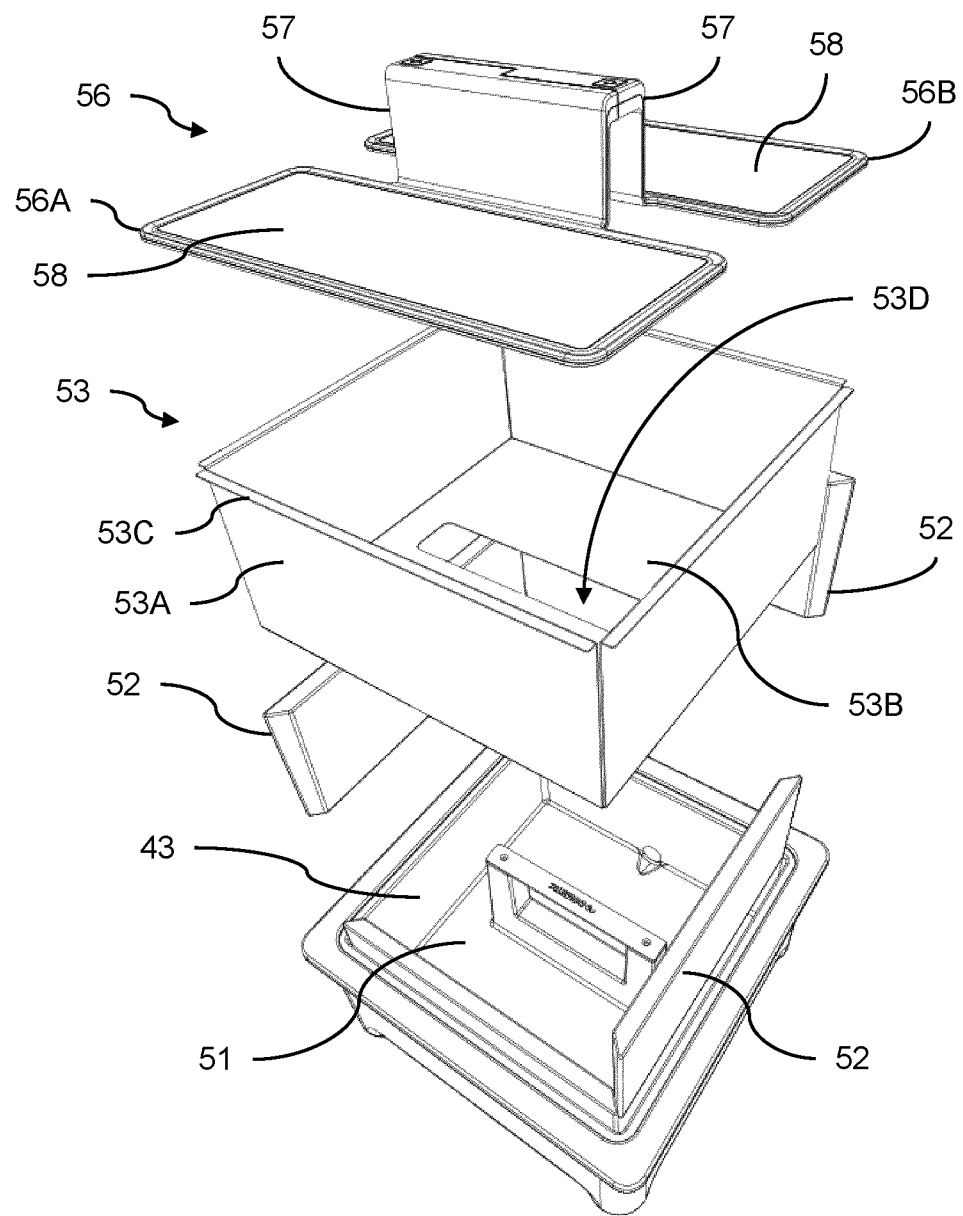
FIG. 16 shows an exploded view of the presentation basket shown in FIG. 13.
Figure 17:
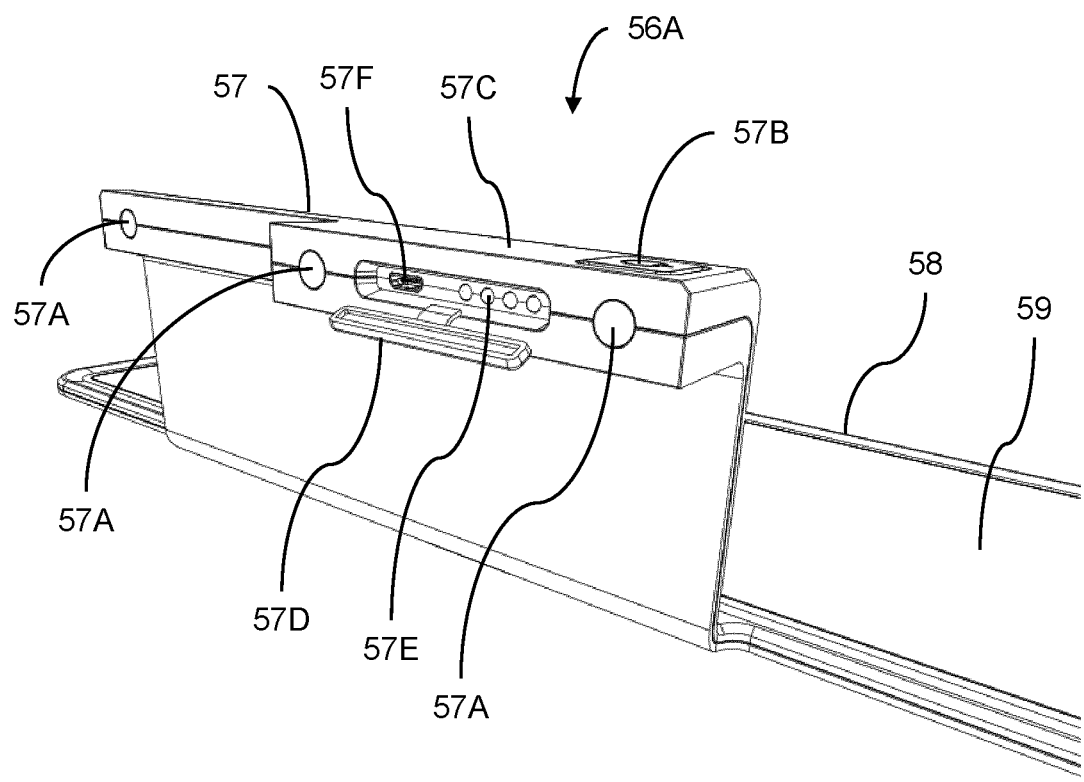
FIG. 17 shows a perspective view of one of the symmetrical parts of the light module.

According to a further equipped embodiment of the presentation basket 40 as shown in FIGS. 15, 16 and 17, the presentation basket 40 further includes four removable ice packs 52, each of which can be inserted at one inner side wall 43. Each ice pack 52 covers the surface of the respective inner side wall 43. The ice packs 52 are of a plate-like shape with a ground surface corresponding to the surface of one inner side wall 43 of the presentation basket 40. The thickness of the ice pack 52 can be selected depending on the desired cooling performance and, when vertically inserted into the presentation basket 40, the horizontal cross-section of the ice pack 52 has a trapezoidal shape so that all four ice packs 52 fit with each other when inserted (cf. FIG. 16). This shape and assembly also prevents the ice packs 52 from falling over.

The presentation basket 40 further includes the sheet metal tray 53 having a ground 53B and four side walls 53A, which is removably placed into the presentation basket 40 and over the ice packs 52. The sheet metal tray 53 in principle is a metal box with open top and upper edges 53C that are folded outwards, in order to rest on the ice packs 52. The underside of the ground 53B of the sheet metal tray 53 rests on the ground 51 of the presentation basket 40 and includes a cutout 53D for the basket handle 46. The sheet metal tray 53 serves for additional stability of the ice pack assembly and due to its material barely hinders the thermal conduction.

The presentation basket 40 further includes the light module 56. The light module 56 is made-up of two symmetrical parts 56A and 56B. Each symmetrical part 56A and 56B has a connecting element 57 and a flat light emitting element 58. When inserted into the presentation basket 40, the symmetrical parts 56A and 56B of the light module 56 are connected to each other via magnets 57A disposed in the connecting elements 57 in the region of the saddle surface 49 of the bracket base 48B. Each connecting element 57 includes a power button 57B and a battery compartment 57C. Furthermore, a rubber lid 57D is provided at each connecting element 57 which covers a battery capacity indicator 57E and a battery charging port 57F. The rubber lid 57D can be easily removed by the hand in case the batteries must be charged or in case the user wants to check the battery level. FIG. 17 shows the rubber lid 57D when opened.

The light emitting element 58 covers the ground 51 of the presentation basket 40 and illuminates beverages placed into the presentation basket 40 from below. The light emitting element 58 is equipped with a frosted plastic plate 59 made of acrylic glass which allows light to pass through. The frosted plastic plate 59 acts as a diffuser that evenly and diffusely distributes light generated by light emitting diodes located at the edges of the frosted plastic plate 59.

Figure 4:
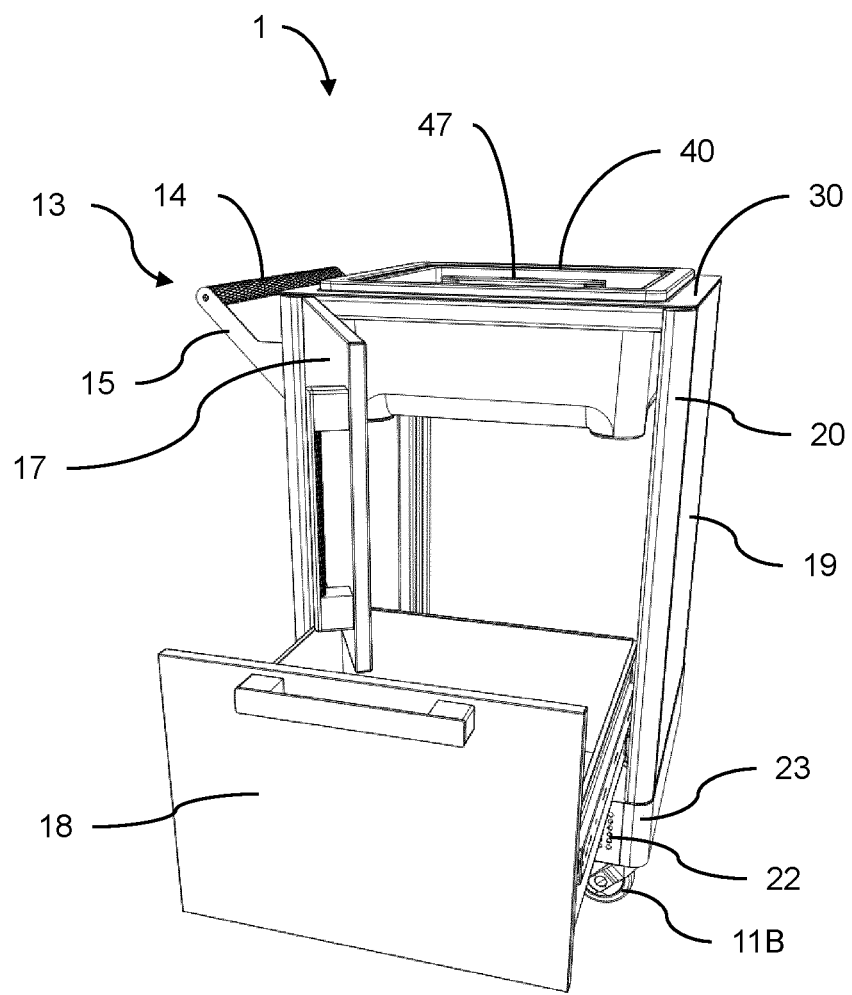
FIG. 4 shows another side view of the beverage serving trolley shown in FIG. 3.

Next, the second embodiment of the beverage serving trolley 1 as shown in FIGS. 3 and 4 is described. Compared to the beverage serving trolley 1 according to the first embodiment, the beverage serving trolley 1 according to the second embodiment is laterally enclosed by a housing, a door 17 and a drawer 18. FIG. 4 shows the beverage serving trolley 1 with open door 17 and the drawer 18 pulled out.

The housing of the beverage serving trolley 1 includes first side panels 19 and edge profiles 20 at an upper part of the beverage serving trolley 1 both vertically extending over the door 17 and the drawer 18, and a second side panel 22 and an encapsulating housing component 23 at a lower part, i.e. under the first side panels 19 and edge profiles 20. These housing components are also present in the beverage serving trolley 1 according to the third embodiment as shown in FIG. 5. In the explanation of the exact construction of the housing components, reference is also made to FIGS. 6, 7 and 8.

The edge profiles 20 comprise a folded metal sheet that includes a curved portion 20A that is wrapped around a vertical edge of the beverage serving trolley 1 and is visible from the outside, and two inwardly bent fixing portions 20B. Both the curved portion 20A and the fixing portions 20B vertically extend over the entire edge profile 20. The fixing portions 20B are flat and oriented in a plane perpendicular to the outside surface of the beverage serving trolley 1 at the respective location.

The first side panels 19 also comprise a folded metal sheet. The side panels 19 predominantly have a flat portion 19A and four inwardly bent fixing portions 19B analogue to those of the edge profiles 20. Two of the fixing portions 19B are vertically arranged and are located respectively at the two sides of the flat portion 19A, while the other two fixing portions 19B are horizontally arranged and are located respectively at the upper and lower edges of the flat portion 19A.

Each of the first side panels 19 is connected via its vertically arranged fixing portions 19B to an edge profile 20. The fixing portions 19B and 20B of one first side panel 19 and one edge profile 20, respectively, are thereby oriented coplanar to each other and screwed together by threaded bolts 60 and nuts 61. Further, a spacer 64 is provided between the interconnected fixing portions 19B and 20B and around the used threaded bolts 60 in order to provide and ensure an even and predetermined vertical gap 21 between the fixing portions 19B and 20B. The vertical gaps 21 are present between each first side panel 19 and edge profile 20 that are connected to each other. In the vertical gaps 21, accessories can be engaged, like the storage box 73 described in connection with the first embodiment. For this purpose, holes like the mounting bore 62B are provided at frequent distances at the fixing portions 19B and 20B of each first side panel 19 and edge profile 20, respectively.

Figure 6:
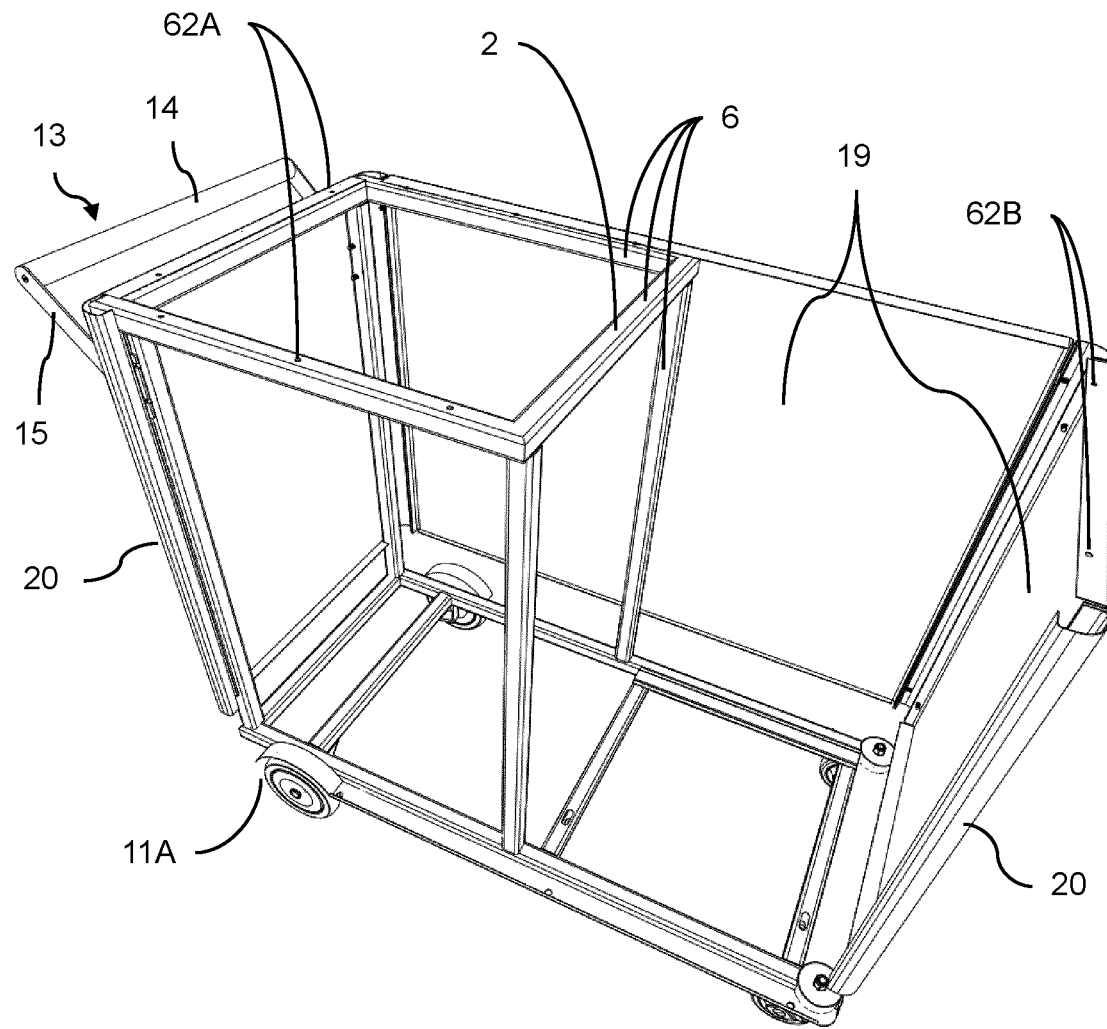
FIG. 6 shows a perspective view on constructional details that may be realized in a beverage serving trolley according to an embodiment and which are realized in the beverage serving trolley as shown in FIG. 5.
Figure 7:
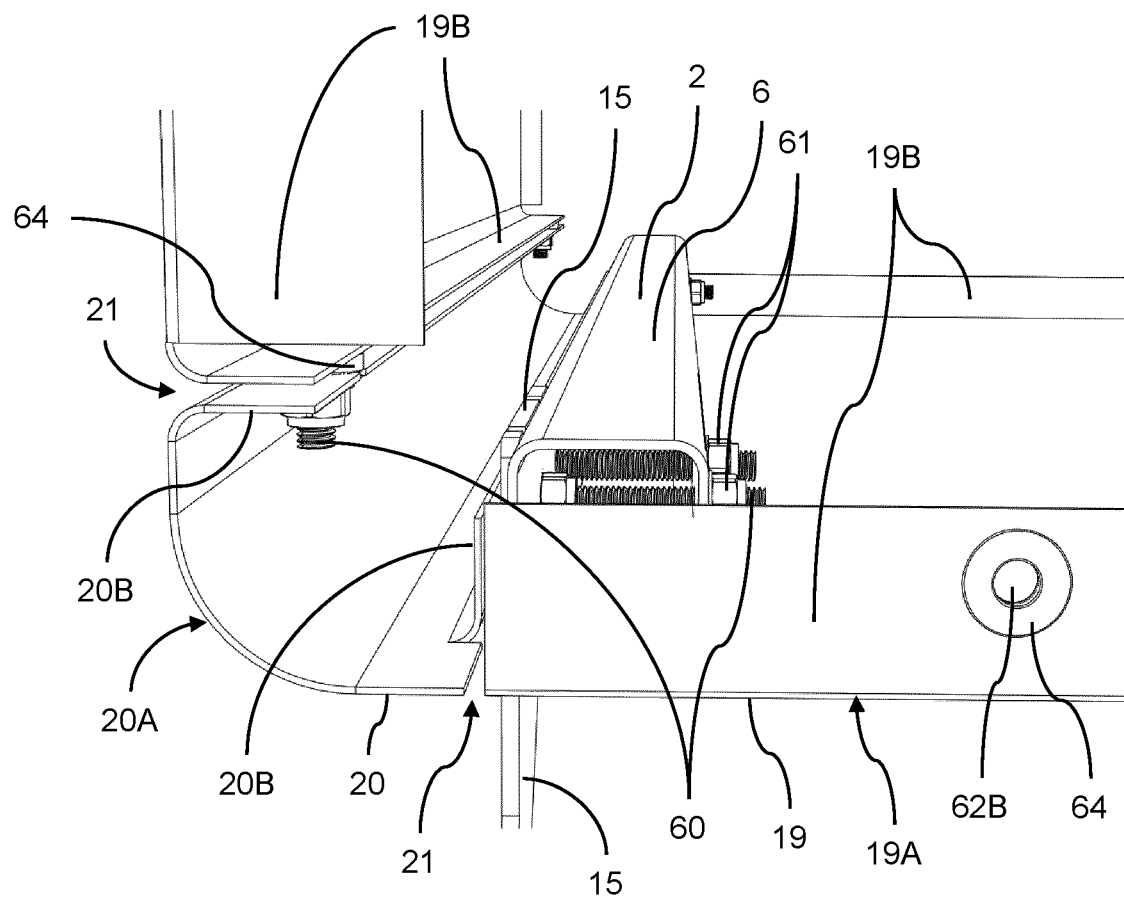
FIG. 7 shows a top view on constructional details that may be realized in a beverage serving trolley according to an embodiment and which are realized in the beverage serving trolleys as shown in FIGS. 3 and 5.

As illustrated in FIG. 6 and shown in FIG. 7 in more detail, the housing components 19 and 20 are additionally fixed to the supporting structure 2 which, in the embodiments shown in FIGS. 3 and 5 is constructed by a plurality of metal square tubes 6. As can be seen, one of the fixing portions 20B of the edge profile 20, one of the fixing portions 19B of the first side panel 19 and one square tube 6 are fixed together with a threaded bolt 61 that reaches through the entire square tube 6 and with nuts 61. At the same location, in addition, the handle bracket 15 is mounted between the fixing portions 19B and 20B of the first side panel 19 and the edge profile 20, respectively. The handle bracket 15 is rigidly mounted and is not intended to be removable like, for example, the above-mentioned accessories that can optionally be installed to the vertical gap 21. Here, the handle bracket 15 also replaces the spacer 64 which would normally be present, as described above.

Figure 8:
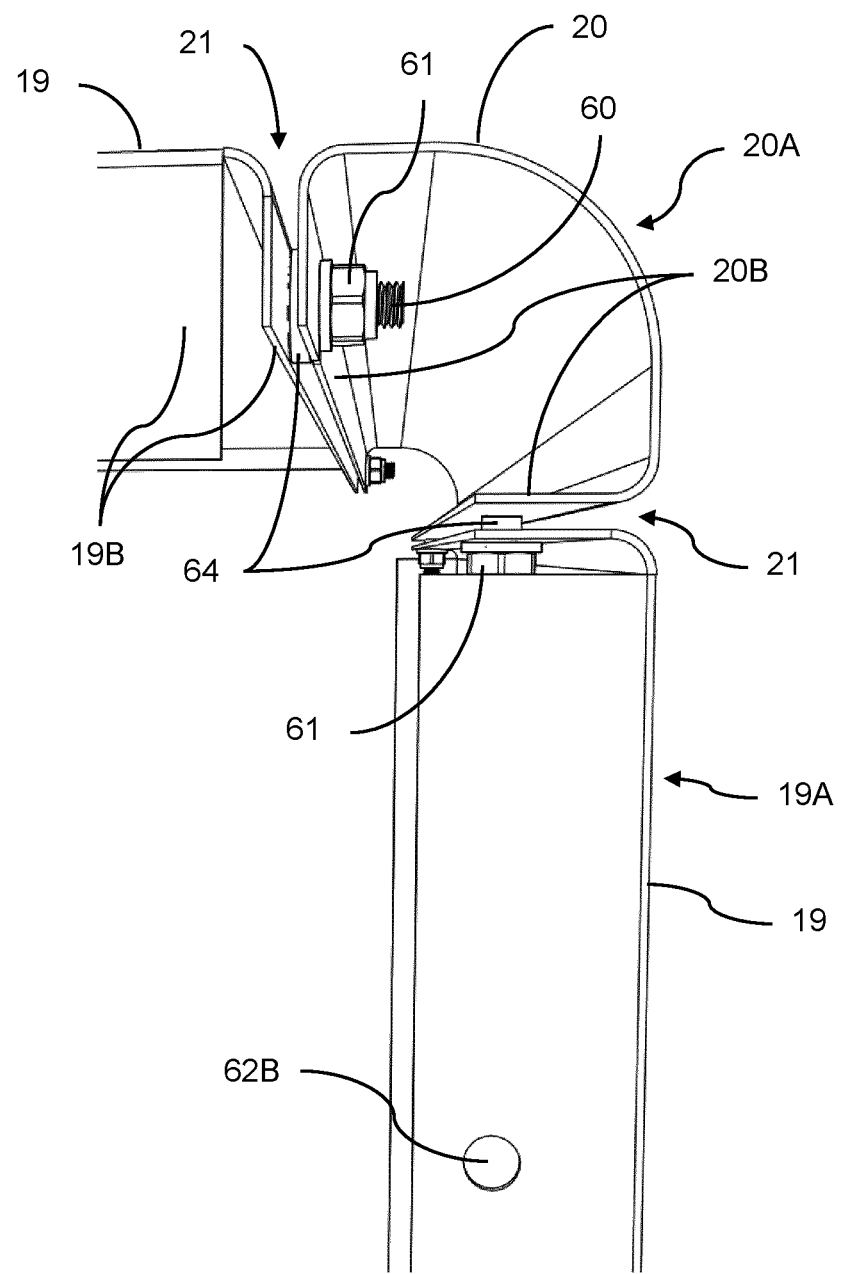
FIG. 8 shows a top view on constructional details that may be realized in a beverage serving trolley according to an embodiment and which are realized in the beverage serving trolley as shown in FIG. 5.

As shown in FIGS. 6 and 8, a square tube 6, i.e. the supporting structure 2 is not necessarily present at each vertical edge of the beverage serving trolley 1. This is, for example, the case with the beverage serving trolley 1 according to the third embodiment as shown in FIG. 5. Here, the interconnected housing components provide for enough stability, since the wine cooling cabinet 72 installed in the front part of the beverage serving trolley 1 contributes to the stability due to its dimensions. Therefore, the square tubes 6 at the respective vertical edges of the beverage serving trolley 1 can be omitted.

As mentioned above, the housing of the beverage serving trolley 1 according to the second embodiment (FIG. 3) and the third embodiment (FIG. 5) has a second side panel 22 and an encapsulating housing component 23 at a lower part, i.e. below the above described first side panels 19 and edge profiles 20. These housing components are flush with the first side panels 19 and the edge profiles 20 and do also have a constant height all around the beverage serving trolley 1. The encapsulating housing component 23 is made-up of one piece and extends over all the four corners while leaving one side free for the second side panel 22, which is the side where the door 17 and drawer 18 are present. The second side panel 22 is perforated in order to allow circulation of air.

As a further difference from the first embodiment, the beverage serving trolley 1 according to the second and the third embodiment as shown in FIGS. 3 and 5 has four wheels 11A and 11B. While the rear wheels 11A are rigid as those of the beverage serving trolley 1 according to the first embodiment, the front wheels 11B are castor wheels that can swivel about a vertical axis for a more convenient maneuvering.

The rear wheels 11A with their outer surface are flush with the housing and, therefore, the second side panel 22 and the encapsulating housing component 23 have respective cutouts for the rear wheels 11A. The distance between the front wheels 11B to one another is shorter than that of the rear wheels 11A, so that the front wheels 11B are offset inwards compared with the rear wheels 11A.

Figure 10:
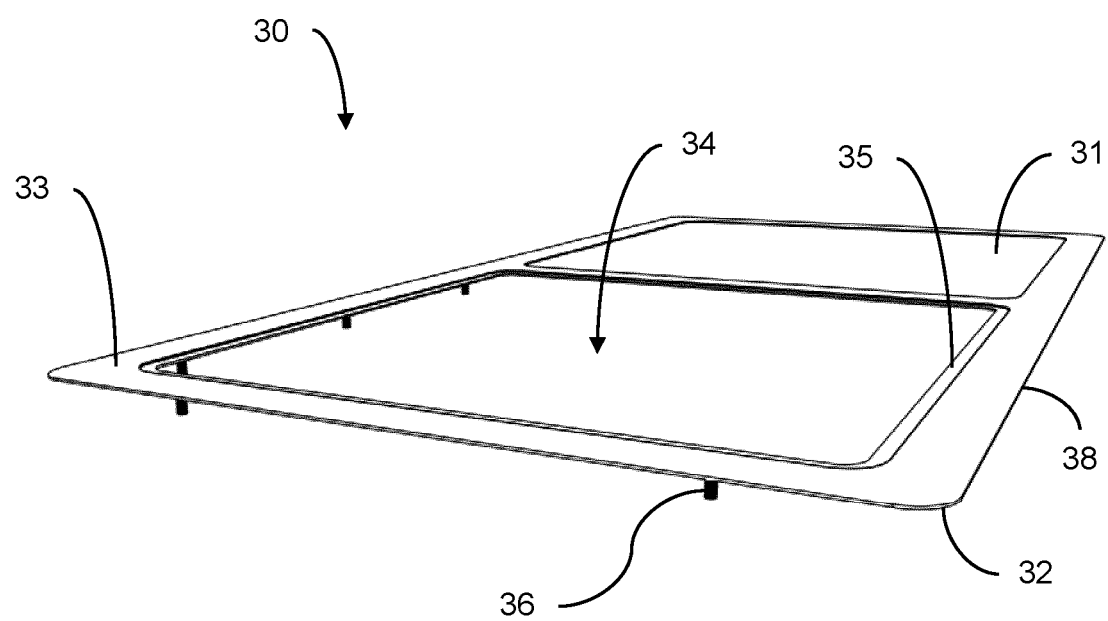
FIG. 10 shows a perspective view on a top plate that may be comprised by a beverage serving trolley according to an embodiment and that corresponds to the one installed in the beverage serving trolley shown in FIG. 5.

The beverage serving trolley 1 according to the second embodiment (FIG. 3) and the third embodiment (FIG. 5) further has a top plate 30. With reference to FIG. 10 which shows an extended embodiment of the top plate 30 that is used with the third embodiment of FIG. 5, the top plate 30 generally has a flat surface 33, is rectangular and has a rim 38 with rounded corners 32 having a curvature that corresponds to that of the curved portion 20A of the edge profiles 20. At all sides of the beverage serving trolley 1 including the front side and the rear side, the rim 38 of the top plate 30 is flush in a vertical direction with the flat portions 19A of the first side panels 19, with the curved portions 20A of the edge profiles 20 and with doors 17 and drawers 18, where present.

The top plate 30 further has a cutout 34 into which the presentation basket 40 is inserted. At the cutout edge 35, the top plate 30 is sunken in order to provide for a smooth fit of the presentation basket 40, which in turn rests on the sunken cutout edge 35 with its supporting surface 41A at the underside of the upper outer rim 41.

Figure 12:
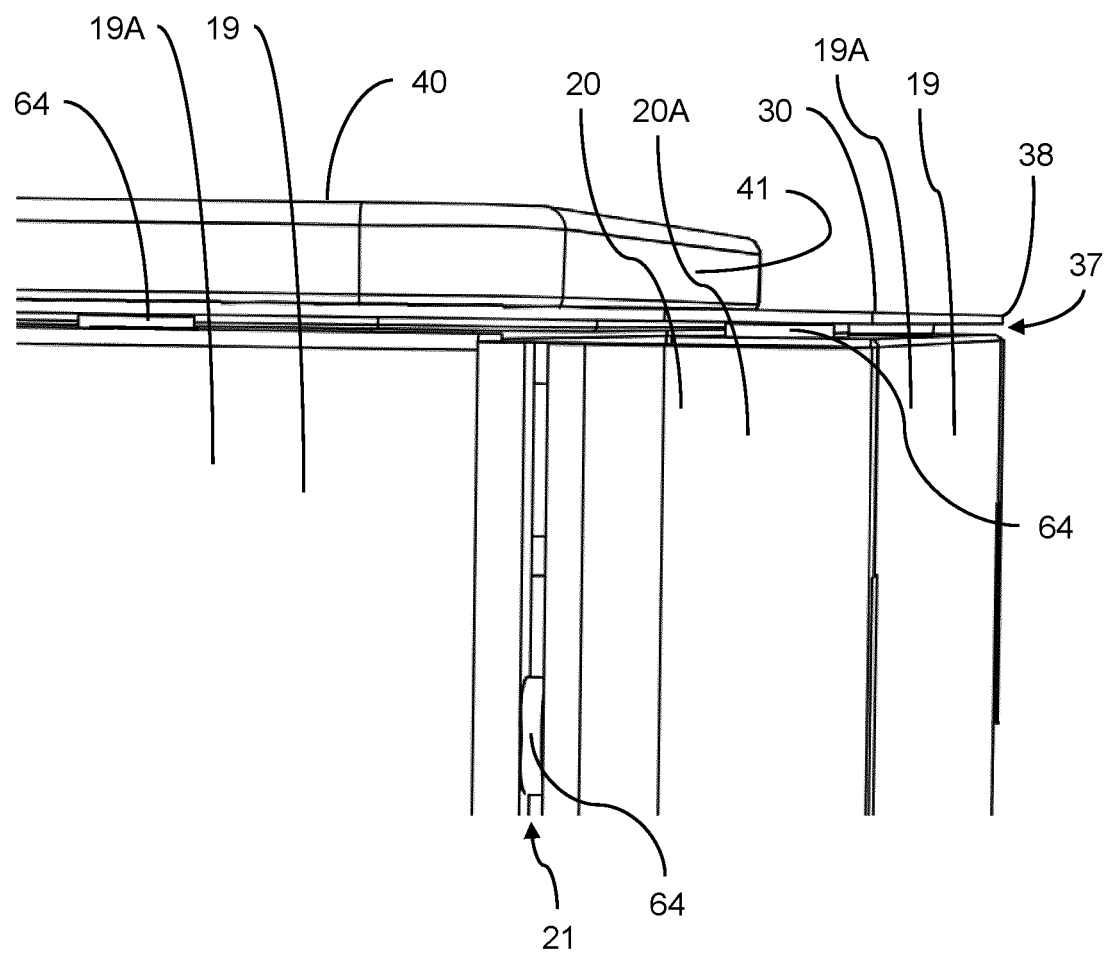
FIG. 12 shows an enlarged section of a perspective side view of the beverage serving trolleys as shown in FIGS. 3 and 5.

Referring to FIG. 12, the top plate 30 is connected to the horizontally arranged fixing portions 19B at the upper edge of the flat portion 19A of the side panel 19. The spacer 64 is provided in between the top plate 30 and the horizontally arranged fixing portions 19B in order to provide for and ensure an even and predetermined horizontal gap 37 between the top plate 30 on the one hand and the first side panels 19 and the edge profiles 20 on the other hand. The horizontal gap 37 corresponds in its width with the vertical gap 21.

Figure 11:
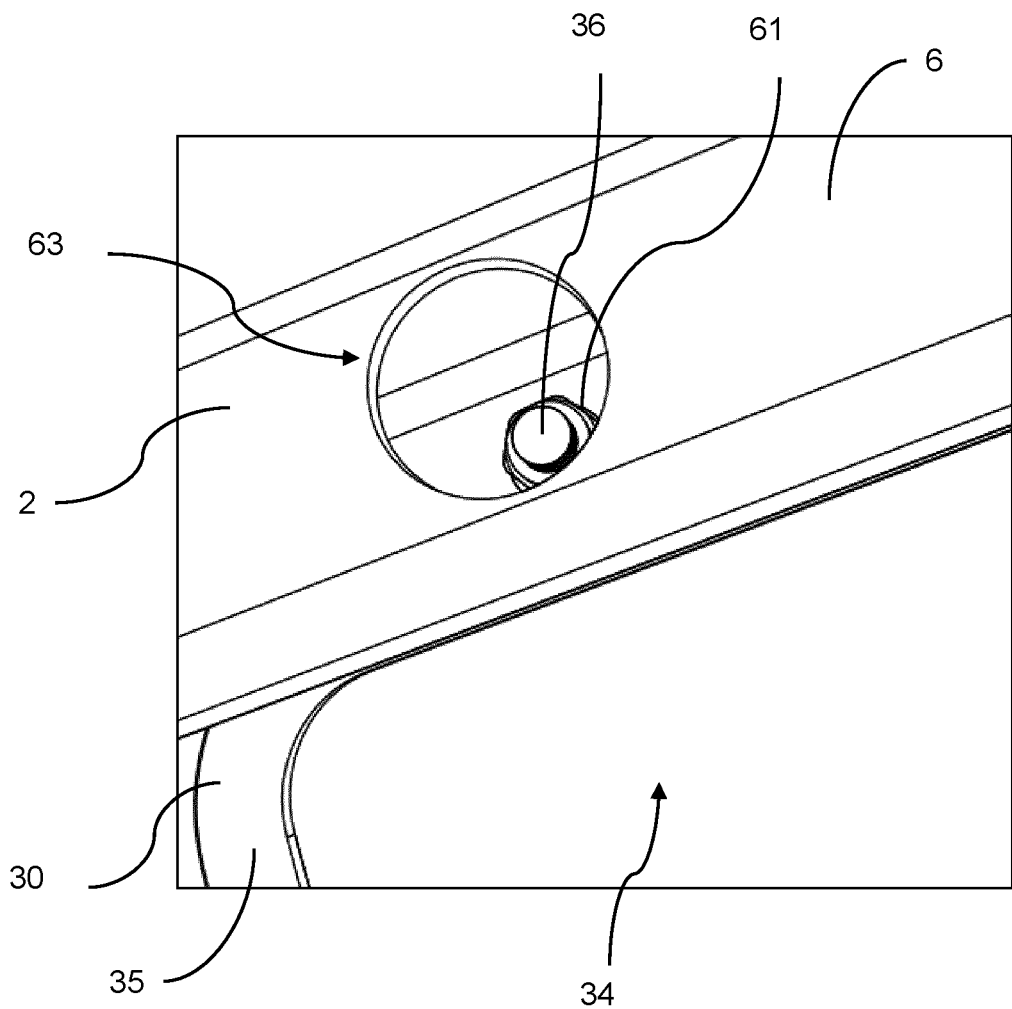
FIG. 11 shows a view from below on a constructional detail that may be realized in a beverage serving trolley according to an embodiment and which are realized in the beverage serving trolleys shown in FIGS. 3 and 5.

For the mounting of the top plate 30, the top plate 30 includes bolts 36 protruding down from the underside of the top plate 30. Each bolt 36 is fastened either only to the respective fixing portion 19B of the first side panel 19, only to a square tube 6 of the supporting structure 2 or to a square tube 6 of the supporting structure 2 with the fixing portion 19B of the first side panel 19 clamped in between. FIG. 11 shows the mounting details when the bolt 36 is fastened to the square tube 6 of the supporting structure 2 in the case where no fixing portion 19B of the first side panel 19 is present. This is, for example, the case at the region of a door 17. As can be seen in FIG. 11, the bolt 36 reaches through the mounting bore 62A (refer to FIG. 6) in the square tube 6. In order to provide access to the bolt 36 and to being able to fastening it with the nut 61, an opening 63 is provided at the square tube 6 which allows access with an appropriate tool (not shown) for fastening the nut 61.

Figure 9:
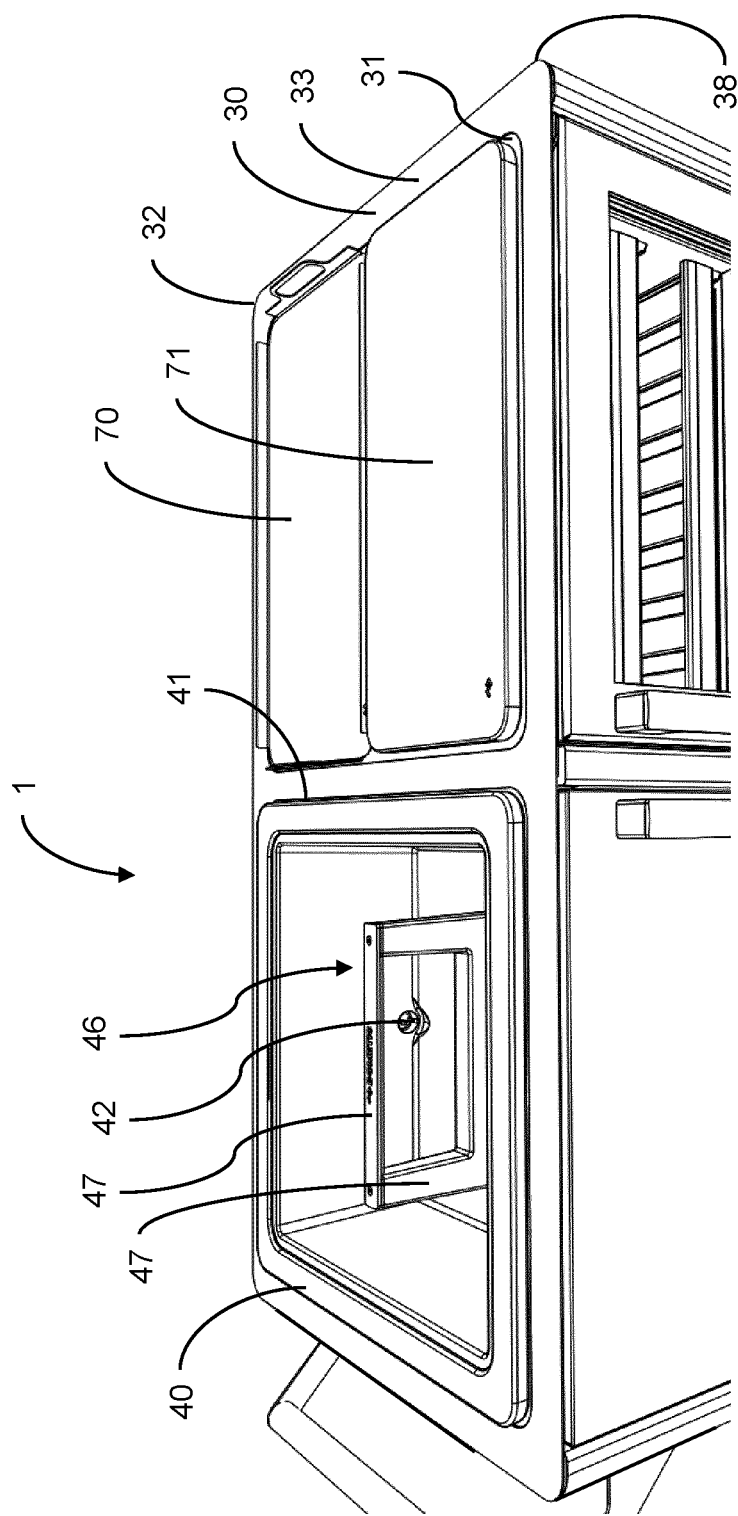
FIG. 9 shows an oblique view on the top part of the beverage serving trolley as shown in FIG. 5.

While the top plate 30 of the second embodiment shown in FIG. 3 is square, the top plate 30 of the beverage serving trolley 1 according to the third embodiment shown in FIG. 5 is broader and further includes an area besides the presentation basket 40 on which a serving tray 70 and a chopping board 71 are placed. FIG. 9 shows the upper part of the beverage serving trolley 1 as an enlarged section with more details of the top plate 30 and FIG. 10 shows the isolated top plate 30. In area next to the presentation basket 40, the top plate 30 has a recessed portion 31 in order to hold the serving tray 70 and the chopping board 71 in place when moving the beverage serving trolley 1. The recessed portion 31 is not subdivided and is one single square shaped recessed portion 31. The serving tray 70 and the chopping board 71 are oblong and fit next to each other in the recessed portion 31 either lengthwise or crosswise to the moving direction of the beverage serving trolley 1.

The third embodiment of the beverage serving trolley 1 as shown in FIG. 5 is larger or, more particular, longer than the second embodiment of the beverage serving trolley 1 as shown in FIG. 3. The beverage serving trolley 1 of FIG. 5 further includes the wine cooling cabinet 72 which is located below the serving tray 70 and the chopping board 71, and next to the door 17 and the drawer 18. The wine cooling cabinet 72 works electrically and the respective power cable (not shown) can be stowed during non-use below the wine cooling cabinet 72 and out of sight. Furthermore, the beverage serving trolley 1 includes a battery (not shown) for the wine cooling cabinet 72 which is either integrated into the wine cooling cabinet 72 itself or provided separately below the wine cooling cabinet 72.

REFERENCE NUMERALS

1 Beverage serving trolley
2 supporting structure
3A rear U-shaped steel plate
3B front U-shaped steel plate
4 vertical part of U-shaped steel plate
5 horizontal part of U-shaped steel plate
6 square tube
11A rear wheel
11B front wheel
13 handle
14 handlebar
15 handle bracket
16 shelf
17 door
18 drawer
19 first side panel
19A flat portion
19B fixing portion of first side panel
20 edge profile
20A curved portion
20B fixing portion of edge profile
21 vertical gap
22 second side panel
23 encapsulating housing component
24 presentation basket supporting frame
25 upper edge of supporting frame
30 top plate
31 recessed portion
32 rounded corner
33 flat surface of top plate
34 cutout
35 cutout edge
36 bolt
37 horizontal gap
38 rim of top plate
40 presentation basket
41 upper outer rim of presentation basket
41A supporting surface
42 outlet
43 inner side wall
44 upper inner rim
45 cover accommodating area
46 basket handle
47 basket handlebar
48 basket handle bracket
48A bracket column
48B bracket base
49 saddle surface
50 footstand
51 ground inside the presentation basket
52 ice pack
53 sheet metal tray
53A side wall of sheet metal tray
53B ground of sheet metal tray
53C upper edge of sheet metal tray
53D cutout of sheet metal tray
56 light module
56A, B symmetrical part of light module
57 connecting element
57A magnet
57B power button
57C battery compartment
57D rubber lid
57E battery capacity indicator
57F battery charging port
58 light emitting element
59 frosted plastic plate
60 threaded bolt
61 nut
62A mounting bore at square tube
62B mounting bore at fixing portion of side panel
63 opening
64 spacer
70 serving tray
71 chopping board 72 wine cooling cabinet
73 storage box
74 board

The invention claimed is:

1. A beverage serving trolley comprising:
a supporting structure, a handle located at a side of the beverage serving trolley for moving the beverage serving trolley, at least one wheel and a presentation basket comprising a basket handle and being configured to receive beverage bottles and ice cubes, wherein
the presentation basket is arranged on the top side of the beverage serving trolley and is inserted into the beverage serving trolley, and that the presentation basket is removable from the beverage serving trolley by lifting the presentation basket in an upward direction by the basket handle;
a cooling cabinet having a door and at least one drawer disposed adjacent to said cooling cabinet;
a first pair of wheels and a second pair of wheels, wherein one pair of said first or second pairs of wheels is larger in diameter than the other pair of said first or second pairs of wheels.

2. The beverage serving trolley of claim 1, wherein one of said first or second pairs of wheels of the beverage serving trolley comprises two rear wheels.

3. The beverage serving trolley of claim 2, wherein the other of said first or second pairs of wheels of the beverage serving trolley comprises two front wheels.

4. The beverage serving trolley of claim 3, wherein the two rear wheels are fixed in orientation and the two front wheels are configured to swivel about a vertical axis.

5. The beverage serving trolley of claim 4, wherein one of the first pair or the second pair of wheels are configured to swivel about a vertical axis and the other pair of the first pair or the second pair of wheels are fixed in orientation.

6. The beverage serving trolley of claim 1, further comprising external attachments for one or more accessories to the beverage serving trolley provided at the supporting structure at different height levels.

7. The beverage serving trolley of claim 6, wherein the beverage serving trolley further comprises an outer housing, including at least one first side panel and at least one edge profile that cover at least in part at least one side and at least one vertical edge, respectively, of the beverage serving trolley, wherein both the at least one first side panel and the at least one edge profile have the same vertical extension and are mounted to the beverage serving trolley in a way that adjacent first side panels and edge profiles are connected flush with each other at their respective vertical edges with a distance, thus forming a vertical gap of an even and predetermined width between each other.

8. The beverage serving trolley of claim 7, wherein the vertical gap is configured to receive the one or more accessories that are to be attached to the beverage serving trolley.

9. The beverage serving trolley of claim 8, wherein the beverage serving trolley further comprises a horizontally arranged top plate having a flat surface and being of a rectangular shape having a rim with rounded corners.

10. The beverage serving trolley of claim 9, wherein the at least one first side panel and the at least one edge profile fit flush with the rim of the top plate in a vertical downward direction with a distance, thus forming a horizontal gap of an even and predetermined width between an underside of the rim of the top plate and upper edges of the at least one first side panel and the at least one edge profile.

11. The beverage serving trolley of claim 10, wherein the top plate has a cutout that is configured to accommodate the presentation basket.

12. The beverage serving trolley of claim 11, wherein the top plate further has at least one recessed portion that is configured to accommodate a serving tray and/or a chopping board.

13. The beverage serving trolley of claim 11, wherein the beverage serving trolley further comprises at least one door and said at least one drawer located on a side of the beverage serving trolley.

14. The beverage serving trolley of claim 13, wherein the at least one door and the at least one drawer are arranged with a vertical range defined by the vertical extension of the at least one first side panel and the at least one edge profile.

15. The beverage serving trolley of claim 14, wherein the cooling cabinet is a wine cooling cabinet.

* * * * *